(12) United States Patent
Schloemer

(10) Patent No.: US 11,206,079 B2
(45) Date of Patent: *Dec. 21, 2021

(54) DATA TRANSMISSION SYSTEMS AND METHODS USING SATELLITE-TO-SATELLITE RADIO LINKS

(71) Applicant: STAR MESH LLC, Princeton Junction, NJ (US)

(72) Inventor: Gerald R. Schloemer, Round Lake, IL (US)

(73) Assignee: STAR MESH LLC, Princeton Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,973

(22) Filed: Aug. 20, 2020

(65) Prior Publication Data

US 2021/0067242 A1    Mar. 4, 2021

Related U.S. Application Data

(60) Division of application No. 16/252,877, filed on Jan. 21, 2019, now Pat. No. 10,784,953, which is a
(Continued)

(51) Int. Cl.
*H04B 7/185* (2006.01)
*G01S 19/06* (2010.01)
*G01S 19/14* (2010.01)

(52) U.S. Cl.
CPC .......... *H04B 7/18556* (2013.01); *G01S 19/06* (2013.01); *G01S 19/14* (2013.01);
(Continued)

(58) Field of Classification Search
CPC ........... H04B 7/18513; H04B 7/18519; H04B 7/1851; H04B 7/18521; H04B 7/2041;
(Continued)

(56) References Cited

U.S. PATENT DOCUMENTS 3,017,777 A  1/1962 Haeussermann
3,815,140 A  6/1974 Buehler et al.
(Continued)

FOREIGN PATENT DOCUMENTS

CN  102027695  4/2011
CN  1728714  7/2011
(Continued)

OTHER PUBLICATIONS

Z. Qu, G. Zhang, H. Cao and J. Xie, "LEO Satellite Constellation for Internet of Things," in IEEE Access, vol. 5, pp. 18391-18401, 2017, doi: 10.1109/ACCESS.2017.2735988. (Year: 2017).*

(Continued)

*Primary Examiner* — Nathan S Taylor
(74) *Attorney, Agent, or Firm* — David M. Quinlan, P.C.

(57) ABSTRACT

Radio communications systems use 100 to 200 satellites in random low-earth orbits distributed over a predetermined range of north and south latitudes. The satellites themselves create a radio route between ground stations via radio links between multiple satellites by virtue of onboard global navigation satellite system circuitry for determining the location of the satellite and route creation circuitry for calculating in real time the direction from the satellite's location at a particular instant to a destination ground station. Directional antennas in the satellites transmit routing radio signals to enhance the probability of reception by other satellites. One embodiment facilitates the creation of satellite-to-satellite links by assigning each satellite a unique identifier, storing orbital information defining the locations of all of the orbiting satellites in the system at any particular time, and including in the radio signal the unique identifier associated with the transmitting satellite.

28 Claims, 9 Drawing Sheets

Related U.S. Application Data continuation of application No. 16/034,413, filed on Jul. 13, 2018, now Pat. No. 10,291,316.

(60) Provisional application No. 62/596,928, filed on Dec. 11, 2017.

(52) U.S. Cl.
CPC ..... *H04B 7/18519* (2013.01); *H04B 7/18521* (2013.01); *H04B 7/18554* (2013.01); *H04B 7/18584* (2013.01)

(58) Field of Classification Search
CPC ...... H04B 1/12; H04B 7/185; H04B 7/18539; H04B 7/1858; H04B 7/18584; H04B 7/18586; H04B 7/18597; H04B 7/2123; H04B 7/18556; H04B 7/185554; G01S 19/13; G01S 19/39; G01S 19/53; G01S 19/06; H04W 36/32; H04W 36/36; H04W 40/023; H04W 40/14; H04W 40/20; H04W 84/06
USPC ....... 455/427, 13.1, 450, 513; 370/219, 236, 370/316
See application file for complete search history.

(56) References Cited

U.S. PATENT DOCUMENTS

| | | | |
|---|---|---|---|
| 4,937,822 A | 6/1990 | Weddle et al. | |
| 4,965,850 A | 10/1990 | Schloemer | |
| 5,274,840 A | 12/1993 | Schwendeman | |
| 5,303,286 A | 4/1994 | Wiedeman | |
| 5,410,728 A | 4/1995 | Bertiger et al. | |
| 5,551,624 A * | 9/1996 | Horstein | B64G 1/1007 455/12.1 |
| 5,561,836 A * | 10/1996 | Sowles | H04B 7/18545 455/428 |
| 5,566,354 A * | 10/1996 | Sehloemer | H04B 7/18539 455/13.1 |
| 5,574,968 A | 11/1996 | Olds et al. | |
| 5,604,920 A | 2/1997 | Bertiger et al. | |
| 5,716,029 A | 2/1998 | Spitzer et al. | |
| 5,757,784 A | 5/1998 | Liebowitz et al. | |
| 5,793,842 A | 8/1998 | Schloemer et al. | |
| 5,812,545 A | 9/1998 | Liebowitz et al. | |
| 5,959,999 A | 9/1999 | An | |
| 6,208,312 B1 | 3/2001 | Gould | |
| 6,219,003 B1 | 4/2001 | Chandler | |
| 6,295,283 B1 | 9/2001 | Falk | |
| 6,404,769 B1 | 6/2002 | Kapoor | |
| 6,459,899 B1 | 10/2002 | Schloemer | |
| 6,775,251 B1 | 8/2004 | Wiedeman et al. | |
| 6,823,170 B1 | 11/2004 | Dent | |
| 6,985,454 B1 | 1/2006 | Wiedeman et al. | |
| 7,292,186 B2 | 11/2007 | Miller et al. | |
| 7,502,382 B1 * | 3/2009 | Liu | H04B 7/18521 370/225 |
| 7,925,167 B1 * | 4/2011 | Kozubal | H04B 10/118 398/125 |
| 8,634,414 B2 | 1/2014 | Leong et al. | |
| 8,816,933 B2 * | 8/2014 | Scott | H04B 7/086 343/879 |
| 8,918,047 B1 | 12/2014 | Teller et al. | |
| 9,035,839 B2 | 5/2015 | Scott et al. | |
| 9,220,047 B2 * | 12/2015 | Furukawa | H04W 40/06 |
| 9,748,989 B1 * | 8/2017 | Freedman | H04B 7/2041 |
| 10,063,309 B2 | 8/2018 | Laufer et al. | |
| 10,084,536 B1 * | 9/2018 | Schloemer | H04W 40/246 |
| 10,084,615 B2 | 9/2018 | Hong et al. | |
| 10,085,200 B1 * | 9/2018 | Schloemer | H04W 16/28 |
| 10,291,316 B1 * | 5/2019 | Schloemer | H04B 7/18556 |
| 10,447,381 B2 | 10/2019 | Schloemer | |
| 10,742,311 B2 | 8/2020 | Speidel et al. | |
| 10,770,790 B1 * | 9/2020 | Mahanfar | H01Q 19/062 |
| 10,784,953 B2 | 9/2020 | Schloemer | |
| 10,791,493 B2 | 9/2020 | Schloemer | |
| 10,979,136 B2 | 4/2021 | Schloemer | |
| 10,998,962 B2 | 5/2021 | Schloemer | |
| 11,038,586 B2 | 6/2021 | Schloemer | |
| 2005/0207375 A1 | 9/2005 | Schiff | |
| 2006/0023717 A1 | 2/2006 | Trachtman et al. | |
| 2007/0070939 A1 | 3/2007 | Hottinen | |
| 2007/0075896 A1 * | 4/2007 | Whitehead | G01S 19/53 342/357.36 |
| 2008/0056189 A1 * | 3/2008 | Hudson | H04B 7/18515 370/330 |
| 2008/0219266 A1 * | 9/2008 | Agarwal | H04B 7/18528 370/392 |
| 2008/0278397 A1 * | 11/2008 | Rao | H01Q 19/17 343/779 |
| 2010/0128678 A1 | 5/2010 | Thesling | |
| 2010/0217879 A1 * | 8/2010 | Weiner | H04L 67/36 709/228 |
| 2011/0287791 A1 | 11/2011 | Fujishima et al. | |
| 2013/0148250 A1 | 6/2013 | Day et al. | |
| 2013/0293415 A1 | 11/2013 | Gutt et al. | |
| 2014/0017992 A1 * | 1/2014 | Bigras | H04B 7/18519 455/12.1 |
| 2014/0027576 A1 * | 1/2014 | Boshuizen | B64G 1/1085 244/158.6 |
| 2014/0177522 A1 * | 6/2014 | Marshack | H04B 7/18513 370/316 |
| 2014/0240449 A1 | 8/2014 | Shefer | |
| 2014/0240497 A1 | 8/2014 | Shefer | |
| 2014/0266867 A1 | 9/2014 | Liu et al. | |
| 2015/0131512 A1 | 5/2015 | Lauer et al. | |
| 2016/0037434 A1 * | 2/2016 | Gopal | H04L 45/02 370/316 |
| 2016/0080072 A1 * | 3/2016 | Baudoin | H04B 7/18586 370/219 |
| 2016/0112117 A1 | 4/2016 | Platzer et al. | |
| 2016/0365629 A1 * | 12/2016 | Yao | H01Q 3/08 |
| 2017/0070939 A1 * | 3/2017 | Chong | H04B 7/18521 |
| 2017/0155443 A1 * | 6/2017 | Haziza | H04B 1/69 |
| 2018/0156924 A1 * | 6/2018 | Reedy | G01S 19/39 |
| 2019/0353799 A1 * | 11/2019 | Grant | G01S 19/27 |
| 2020/0024012 A1 * | 1/2020 | Fortezza | B64G 3/00 |

FOREIGN PATENT DOCUMENTS

| | | |
|---|---|---|
| CN | 103281115 | 9/2013 |
| CN | 102301774 | 4/2014 |
| CN | 104661276 A | 5/2015 |
| CN | 106788682 A | 5/2017 |
| CN | 106664507 | 12/2020 |
| EP | 0935349 A2 | 8/1999 |
| EP | 1523062 | 4/2005 |
| IN | 4263/CHE/2013 | 3/2015 |
| JP | 677889 | 3/1994 |
| WO | 2009123112 | 10/2009 |
| WO | 2009139778 | 11/2009 |
| WO | 2015184055 | 12/2015 |
| WO | 2016060954 | 4/2016 |

OTHER PUBLICATIONS

Review of Formation Flying and Constellation Missions Using Nanosatellites Saptarshi Bandyopadhyay, Rebecca Foust, Giri P. Subramanian, Soon-Jo Chung, and Fred Y. Hadaegh Journal of Spacecraft and Rockets 2016 53:3, 567-578 (Year: 2016).*

Cox, Donald C., "Wireless Network Access for Personal Communications," IEEE Communications Magazine (Dec. 1992), pp. 96-115.

Satellite Systems Engineering in an IPv6 Environment, Minoli, Daniel, CRC Press, Boca Raton, FL (2009), pp. 78-80.

Chabot, J. A., "A Spherical Magnetic Dipole Actuator for Spacecraft Attitude Control," Thesis for M.S. in Aerospace Engrg. Sciences, Univ. of Colorado, 2015.

"Iridium Satellite Constellation," Wikipedia, https://en.wikipedia.org/wiki/Iridium (last visited May 9, 2017).

(56) References Cited

OTHER PUBLICATIONS

"Project Loon," Wikipedia, https://en.wikipedia.org/wiki/Project_Loon (last visited Sep. 27, 2017).
Wade, P., "Multiple Reflector Dish Antennas," copyright 2004.
International Search Report in PCT/US2017/48110, dated Nov. 3, 2017.
Invitation to Pay Additional Fees dated Nov. 14, 2018, in PCT appln. No. PCT/US2018/053002.
International Search Report and Written Opinion dated Jan. 22, 2019, in PCT appln. No. PCT/US2018/053002.
International Search Report and Written Opinion dated Apr. 8, 2019, in PCT appln. No. PCT/US2018/064041.
International Search Report and Written Opinion dated Nov. 12, 2019, in PCT appln. No. PCT/US2019/041428.
Supplementary European Search Report dated Feb. 25, 2020, in EP appln. No. 17844319.8 (PCT/US2017/048110).
Chakraborty, D., "Survivable Communication Concept via Multiple Low Earth-Orbiting Satellites," IEEE Transactions on Aerospace and Electronic Systems, vol. 25, No. 6 (Nov. 1989), pp. 879-889.
EPO office action in EP appln. No. 18860787.3-1215, dated May 21, 2021.
Official Action in Chinese Appln. No. 2018800627936, dated Jul. 28, 2021.
Radhakrishman, R., et al., Survey of Inter-Satellite Communication for Small Satellite Systems: Physical Layer to Network Layer View, IEEE Comms. Surveys & Tutorials, vol. 18, No. 4 (4th Qtr. 2016).
EPO Official Action in EP appln. No. 18888292.2, dated Aug. 31, 2021.

\* cited by examiner

| | $S_{16}$ | $S_{26}$ | $S_{102}$ | $S_{42}$ | $S_2$ | $S_{67}$ | $S_{25}$ | $S_{17}$ | $S_{63}$ | $S_6$ | $S_7$ | $S_{40}$ | $S_{83}$ | $S_{64}$ | $S_{120}$ | $S_{72}$ | $S_{134}$ | $S_{132}$ | $S_{152}$ | $S_{146}$ | $S_{163}$ | $S_{131}$ |
|---|---|---|---|---|---|---|---|---|---|---|---|---|---|---|---|---|---|---|---|---|---|---|
| $S_{16}$ | | 4000 | 2000 | 1100 | 700 | 1100 | 1300 | 1800 | 1200 | 3900 | 1800 | | | | | | | | | | | |
| $S_{26}$ | 4000 | | 1000 | 1500 | 2100 | 4100 | 4300 | 4600 | 4600 | 6100 | 6300 | | | | | | | | | | | |
| $S_{102}$ | 2000 | 1000 | | 1300 | 2800 | 4000 | 4100 | 6000 | 5600 | 5400 | 4300 | | | | | | | | | | | |
| $S_{42}$ | 1100 | 1500 | 1300 | | 1400 | 1900 | 1900 | 3200 | 6000 | 5600 | 5400 | | | | | | | | | | | |
| $S_2$ | 700 | 2100 | 2800 | 1400 | | 800 | 1500 | 1500 | 1500 | | | | | | | | | | | | | |
| $S_{67}$ | 1100 | 4100 | 4000 | 1900 | 800 | | 1600 | 800 | | | | | | | | | | | | | | |
| $S_{25}$ | 1300 | 4300 | 4100 | 1900 | 1500 | 1600 | | 1300 | | | | | | | | | | | | | | |
| $S_{17}$ | 1800 | 4600 | 6000 | 3200 | 1500 | 800 | 1300 | | | | | | | | | | | | | | | |
| $S_{63}$ | 1200 | 4600 | 5600 | 6000 | | | | | | | | | | | | | | | | | | |
| $S_6$ | 3900 | 6100 | 5400 | 5600 | | | | | | | | | | 3000 | | | | | | | | |
| $S_7$ | 1800 | 6300 | 4300 | 5400 | | | | | | | | | | 2800 | | | | | | | | |
| $S_{40}$ | | | | | | | | | | | | | | 2200 | | | | | | | | |
| $S_{83}$ | | | | | | | | | | | | | | 2300 | | | | | | | | |
| $S_{64}$ | | | | | | | | | | 2300 | 2200 | | 700 | | | | | | | | | 5200 |
| $S_{120}$ | | | | | | | | | | | | 900 | | 1700 | | | | | | | | 4000 |
| $S_{72}$ | | | | | | | | | | | | | | 1800 | | | | | | | | 4000 |
| $S_{134}$ | | | | | | | | | | | | | | 900 | | | | | | | | 4400 |
| $S_{132}$ | | | | | | | | | | | | | | 700 | | | | | | | | 4100 |
| $S_{162}$ | | | | | | | | | | | | | | | | | | | | | | 3900 |
| $S_{146}$ | | | | | | | | | | | | | | | | | | | | | | 1900 |
| $S_{163}$ | | | | | | | | | | | | | | | | | | | | | | 2000 |
| $S_{131}$ | | | | | | | | | | | | | | | | | | | | | 1900 | |

FIG. 9

DATA TRANSMISSION SYSTEMS AND METHODS USING SATELLITE-TO-SATELLITE RADIO LINKS

CROSS-REFERENCE TO RELATED APPLICATIONS

This application claims the benefit of U.S. provisional application No. 62/596,928 filed Dec. 11, 2017, the entire contents of which is incorporated herein by reference. Also incorporated by reference herein in their entirety are the inventor's U.S. patent application Ser. No. 15/656,111 filed Jul. 21, 2017, Ser. No. 15/719,611 filed Sep. 29, 2017, No. 62/580,463 filed Nov. 2, 2017, and No. 62/595,919 filed Dec. 7, 2017, and the inventor's international application no. WO 2018/039292, published Mar. 1, 2018.

BACKGROUND OF THE INVENTION

Field of the Invention

The present invention relates to transmitting data from one location on the ground to another using orbiting linking nodes, and more particularly, to establishing radio links between satellites in a constellation of plural random-orbit satellites sufficient in number to enable data to be transmitted between distant ground stations on the earth's surface via a radio route comprising one or more satellite-to-satellite radio links.

Description of Related Art

The inventor's U.S. application Ser. No. 15/656,111 (sometimes referred to as "the '111 application") discloses a novel radio communication system that employs satellites in random orbits without active, onboard attitude control. (The special meaning of "random orbit" as used in the present description and the cross-referenced applications is reiterated further below.) Unlike satellites in many known space-based communications systems, the satellites in the '111 application have no propulsion systems or movable mechanical parts to maintain them in particular orbits or attitudes. As a result, the satellites can be made very small, light, and at a low cost, with the goal of allowing a constellation of possibly hundreds of satellites to be launched and inserted into orbit at a fraction of the cost required to establish the kind of satellite infrastructure used in common prior art satellite communication systems. In one embodiment the inventor's prior systems use a sufficient number of such satellites, up to 200 or more, to make it likely that multiple satellites will be in line of sight from any given region of the earth's surface. By combining a unique way of creating radio links with novel satellite antenna structure, the system can readily establish ground-to-satellite radio links for data communications to and from the satellite constellation and the ground. The inventor's '111 application and application Ser. No. 15/719,611 (sometimes referred to as "the '611 application") disclose various embodiments of antenna structure for satellites useful in the systems disclosed herein.

The satellite radio systems in the '111 and '611 applications rely principally on the probability that with enough satellites in random orbits, there will be a sufficient number in line of sight of ground stations and other satellites (collectively referred to as "nodes") to enable antennas on two different nodes to pair together and form an internode radio link. However, the probability of being able to create a radio route between any two ground stations decreases as more satellite-to-satellite links are incorporated into a route. Satellite antennas configured like those described in the '111 and '611 applications increase the likelihood that antennas on different satellites will form pairs, but the most reliable route creation between two ground stations will involve a two-hop route through a single satellite. This is because ground stations can use far more antennas and make them much more powerful since ground stations are not limited in size or weight like the satellites, which have relatively low-gain antennas and limited available electrical power.

In many cases limiting the route to a single satellite will have little or no effect on system performance. For example, in one embodiment described in the '111 application using a constellation of 200 satellites in random orbits, it is likely that a ground station anywhere in a given country such as Egypt will "see" about 10 satellites. Or, stated another way, the probability that at least one satellite will not be within sight of anywhere in the region is only about 35 in one million, depending on how close a particular satellite is to the horizon from the ground station location. One way to cover larger distances with single-satellite routes is to provide a terrestrial connection between two intermediately sited ground stations. In this approach, an originating ground station is connected via a single-satellite route to one intermediate ground station, which is connected terrestrially to another intermediate ground station. The second intermediate ground station is in turn connected via a single-satellite route to the destination ground station. But that approach may be difficult to implement for ground locations separated by a large body of water such as an ocean or by terrain with an inhospitable climate such as a desert or rain forest.

Enabling spaced-based communications over widely separated locations using satellite-to-satellite links has been approached mainly in the context of a system infrastructure comprising satellites maintained in prescribed orbits. U.S. Pat. No. 7,502,382 to Liu et al. describes an example of a system specifically intended for transmitting information over satellite-to-satellite radio links. Liu deploys satellites in multiple cohorts that have prescribed orbital planes. In the embodiment described in the patent, the satellites are in three fixed orbits with cohorts of nine satellites distributed uniformly within their respective orbits. Any satellite in one of the orbiting cohorts can establish radio links with the adjacent satellites in the same orbit and with a satellite in each of the other orbits. A packet of information transmitted from a source satellite destined for a satellite in another orbital plane, travels via in-plane links to a satellite in the same plane that can form a link with another plane where the destination satellite is located. Routing tables are uploaded from the ground and stored at each satellite so that the route from one satellite to another is predestined.

While Liu's system can, at least theoretically, create effective satellite-to-satellite links, it suffers from many of the same drawbacks as the prior art described in the patent applications cross-referenced above. Liu requires its satellites to be maintained in rigidly prescribed orbits, which in turn requires them to have propulsion systems, thus making them large and heavy, as well as costly to build and launch. But it will be clear to those skilled in the art that the route creation techniques employed by the Liu system with satellites maintained in known orbits cannot work in a system in which the satellites are not in prescribed orbits. That is, the operability of Liu's system relies on having the satellites in precisely maintained orbits at particular altitudes so that each satellite knows the exact directions in which to transmit signals toward other satellites.

An example of a similar satellite system that was actually commercialized is disclosed in various patents such as U.S. Pat. No. 5,274,840 to Schwendeman and U.S. Pat. No. 5,410,728 to Bertiger et al., both of which are assigned to Motorola, Inc. This system also utilized satellites evenly distributed in a predetermined number of polar orbits as transceivers for signals between satellites and between satellites and transceivers on the ground. This system was commercialized by Iridium, but had the drawbacks common to all satellite systems relying on keeping the satellites in known, predetermined orbits. The satellites needed onboard thrusters, rocket fuel, and navigational hardware to maintain their desired orbits, which increased satellite size and weight. This in turn made the satellites costly and expensive to launch. And to account for inevitable satellite failures, extra satellites have to be maneuvered into a failed satellite's orbit, thus increasing the cost of the entire system by requiring extra satellites and their concomitant high manufacturing and launch costs. Ground-based orbit and attitude control using complex computer technology further increased system costs. In the end, its drawbacks made the system commercially unviable for mass market applications, although it is believed to have found use in specialized areas such as military applications and reporting by journalists from remote areas.

Prior art systems like these can provide radio routes between ground stations too far apart to be linked by a two-hop, ground-satellite-ground radio route. However, they require satellites with onboard propulsion systems to insert them into their prescribed orbits and maintain them there. This makes them expensive to engineer and manufacture and increases their weight, which in turn makes them costly to launch. In addition, operation of these systems requires infrastructure and personnel to maintain the satellites in their prescribed orbits. When a satellite's orbit decays or its propulsion system malfunctions, another heavy, costly satellite must be inserted into the failed satellite's place in the system.

What is needed is a way of using small, lightweight satellites such as those described in the '111 and '611 applications, deployed in uncontrolled random orbits to reliably deliver data communications between far-distant locations on the earth's surface.

SUMMARY OF THE INVENTION

It is an object of the present invention to provide a radio communication system comprising a constellation of satellites that provide a plurality of linking nodes capable of establishing reliable intersatellite radio links without requiring the satellites to be maintained in predetermined orbits or to Incorporate active attitude control mechanisms for maintaining them in predetermined attitudes relative to each other. These features enable the use of small, lightweight satellites that can be inexpensively engineered and launched.

In another aspect of the invention, the satellites include a plurality of antennas capable of transmitting and receiving in multiple directions. Embodiments of satellites suitable for use in the system are described in co-pending U.S. patent application Ser. No. 15/656,111 and Ser. No. 15/719,611, and the structure and operation of the satellites described in both applications is incorporated herein by reference as if set out in full. These satellites can be used in the random orbit systems and methods described herein to increase the reliability and predictability of data communications between ground locations distant from each other as compared to the systems and methods described in the inventor's prior U.S. applications and its international application no. WO 2018/039292 (sometimes referred to as "WO '292"). The systems and methods described herein have particular utility in creating radio routes between ground locations so far apart that two-hop/single-satellite radio routes may be difficult or impossible to establish between them.

A particular aspect of the systems and methods disclosed herein involves blanketing the earth with a large plurality of lightweight random-orbit satellites powered by batteries recharged via solar panels on the satellites, each of which satellites has onboard global navigation satellite system (GNSS) circuitry that enables it to determine its location relative to the earth's surface. With this capability, a number of novel strategies are available to reliably create satellite-to-satellite radio links for the transmission of data. In combination with the fact that there are a sufficient number of satellites in the constellation to ensure that all or nearly all locations on the earth's surface are within sight of numerous satellites, data can be reliably transmitted between ground stations too far distant for communications via a single satellite.

In certain preferred route creation strategies according to the present invention, every satellite stores the orbital parameters of every other satellite. This enables one satellite that received a data transmission designated for a particular destination ground location to select one or more other satellites to which it can transmit the data communication for providing a preferred radio route to its destination. A satellite can send its particular orbital parameters to other satellites via one or more ground stations, or by transmitting them directly to other satellites for dissemination throughout the satellite constellation.

One aspect of the invention rests in part on incorporating in each such satellite a plurality of antennas capable of transmitting and receiving in many different directions. A radio link can be created when a radio beam transmitted from an antenna in one satellite is received by an antenna in another satellite. This is sometimes referred to herein as a "beam match." Using a unique antenna arrangement and uniquely coded radio transmissions from the satellites and ground stations enables a radio route to be established between ground stations by assembling radio links via one or more of the satellites.

In one of its more general aspects the present invention uses a unique satellite construction with on-board computers that can perform calculations and select antennas to create radio routes between ground stations via one or more satellites virtually in real time as the satellites move in uncontrolled orbits with no attitude control. The radio routes are determined by methods executed by computers carried by the satellites, so that a central computer is not needed to specify which satellite or satellites will comprise an optimum radio route between ground stations.

A particular advantage of the system disclosed herein is that in a preferred embodiment it provides the above features and those described in more detail below by blanketing the earth with lightweight, battery-powered satellites that reduce launch costs and eliminate the necessity for complex and costly control systems for maintaining the satellites in particular orbits and in particular attitudes. Another aspect of the invention uses ground stations with an antenna arrangement different from that used in the satellites, since the limitations on satellite weight, size, and power do not apply to the ground stations. This means that the ground stations can have a greater antenna density (more antenna beams over a given spherical area) and use antennas with more power (gain), thus virtually ensuring that data communications will be possible between any two ground stations via one or more satellites.

Another embodiment of the invention enhances the ability of the satellites to establish radio links between satellites and between a satellite and a ground station by using satellites that spin or rotate about an axis. This increases the probability of creating a beam match between two satellites because each satellite is likely to "see" more antennas on other satellites during a given period of time. This enables the use of higher-gain antennas with correspondingly narrower beam widths, thus increasing the strength of the radio links and the reliability of data transmissions. Typically, the satellites are deployed with a predetermined angular velocity, which may be different for different satellites. In one variation of this embodiment, the system includes satellites that rotate in opposite directions. Further considerations for realizing this embodiment are discussed in the detailed description that follows.

Yet another embodiment of the invention further enhances the ability of the system to establish radio links between system nodes (satellites and ground stations) by using multi-feed parabolic antennas to transmit plural radio beams from each antenna over a prescribed spherical area. The antennas have larger reflectors than single-feed antennas used in other embodiments so that each radio beam has more gain. Although the satellites according to the present embodiment will likely be larger and heavier than satellites with a comparable number of single-feed antennas, they will transmit a greatly increased number of high-gain radio beams available for creating beam matches representing higher quality radio links between system nodes.

Still another embodiment of the invention the ground stations can be mounted on low-flying drones, typically at altitudes of no more than 500 feet, to increase the area served by a particular ground station and increase the number of users on the ground able to connect with the system. This embodiment will have particular utility in areas with a low population density or areas with limited accessibility where building plural tower-based ground stations to serve a comparable number of users would be prohibitively expensive.

These and other aspects and features of the invention and embodiments thereof will be covered in more detail as this description proceeds.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 1, comprising

FIG. 9 is a matrix with entries representing the distance in miles between pairs of satellites in a swath of the earth's surface between ground stations in the portion of the earth's surface depicted in FIG. 8.

Figure 1A:
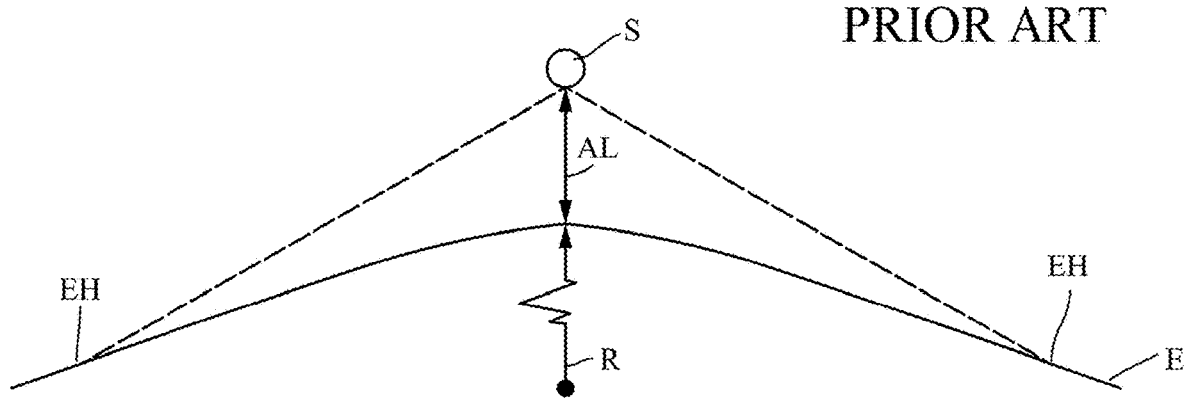
FIGS. 1A and 1B, illustrates geometric principles relevant to the use of satellites in low-earth orbits in space-based radio systems disclosed and claimed herein FIG. 2 schematically depicts an embodiment of a satellite suitable for use in the space-based radio systems disclosed and claimed herein.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OP PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

The following detailed description of certain preferred embodiments of the invention is organized as follows:

I. Definitions
II. Basic Concepts and Principles of Systems Using Satellite Linking Nodes
   A. Satellite Design: Antenna Configuration and Onboard Control Circuitry
   B. Satellite Features Facilitating Satellite-to-Satellite Radio Links
III. Route Creation Methods
   A. Creating a Universal Satellite infrastructure
      1. Ground Stations Relay Orbit Parameters Between Satellites
      2. Orbit Parameters Transmitted Directly Between Satellites B. Zone/Matrix Systems for Creating Radio Routes With Satellite-to-Satellite Links
  1. Full Zone/Matrix System
  2. Limited Zone/Matrix System
  3. Dynamic-Hold Zone/Matrix System
  4. Variable Zone/Matrix System
C. Zone/Direction System for Creating Radio Routes With Satellite-to-Satellite Links
D. Vector/Direction System for Creating Radio Routes With Satellite-to-Satellite Links IV. Other Modifications and Variations
A. Rotating Satellites
  1. Counter-Rotating Satellites
  2. Satellites Rotating at Different Angular Velocities
  3. Other Considerations
B. Drone-Mounted Ground Stations
C. Blockchain Principles Applied to Radio Routes with Satellite-to-Satellite Links V. Summary and Conclusion

I. DEFINITIONS

The description that follows uses numerous terms intended to have specific meanings. One concept central to certain embodiments of the system described and claimed herein is that the satellites can be in "random orbits." This term must be considered in the context of the number of satellites in the system, and generally means that a sufficient number of satellites are placed into orbits that are initially spaced apart with the goal of maximizing coverage of the globe, or at least a desired swath of the globe between designated northern and southern latitudes. Although it covers a random distribution in a pure mathematical sense, it is not so limited. Rather, "random" as applied to orbiting satellites means that precise positioning of satellites at particular locations and particular times is not required, and that the manner of placing them into orbit will take into account the number of satellites comprising the system and the desired degree of certainty, calculated in accordance with suitable statistical methods, that any given point on the earth's surface should be within sight of at least one satellite at all times. (It will be appreciated that different satellites will satisfy that requirement for a given point at different times, since satellites will be constantly moving into and out of sight of any particular point on the earth's surface as they orbit) For example, known methods for generating so-called pseudorandom numbers can be used as a basis for calculating initial satellite numbers and placement. Some ways of achieving "random" satellite distribution are described in U.S. Pat. No. 5,566,354 in the "Satellite Launch" section, which is incorporated herein by reference.

To summarize, "random orbits" means that the satellites are deployed so that the location of any particular satellite relative to other satellites and to the earth at any given time is not controlled after the satellites are launched into orbit, although they may be deployed in a manner designed to maximize coverage of a particular swath of the earth's surface. As noted, "random orbits" does not require the satellites to be deployed randomly in a mathematical sense, but it is within the scope of the term "random orbits" to use mathematical methods to determine satellite deployment directions, angles, altitudes, velocities, etc. that take into account the geographic areas of the earth to be served by radio routes created using the satellites. In addition, Individual satellites can be launched in different orbital directions (eastward or westward around the earth) in combination with any of those or other deployment techniques, in furtherance of the goal of making their locations appear arbitrary relative to each other and to an observer on the earth. For example, the satellites could be ejected in different directions at different velocities from a launch vehicle traveling in an orbital direction (that is, generally eastward or westward), so that after a time they will have separated themselves into orbits in an essentially uncontrolled manner and assume "random orbits" within the definition used herein. This would also include using one or more launch vehicles traveling in a given orbital direction to launch all of the satellites in the constellation.

The term "passive attitude control" and the related term "without active attitude control" as applied to a satellite in the systems described herein mean that the satellite carries no attitude control mechanism with parts that are moved to different positions to intentionally change the attitude of the satellite with respect to an external frame of reference. Examples of active attitude control mechanisms would be propulsion systems with thrusters capable of imparting moments on the satellites to cause it to rotate, or mechanical means with moving parts that can be used to change the center of gravity or angular momentum of the satellite. The terms do not exclude the use of passive means for changing satellite attitude without moving parts, whereby a satellite may tend to assume a particular attitude over time simply by virtue of its structure and the materials used in its manufacture. In addition, the terms do not exclude electrical means for influencing a satellite's attitude. This could include techniques such as selective switching of arrays of one or more electromagnets to vary their interaction with the earth's magnetic field in a manner that changes the satellite's attitude. Similar techniques known presently or developed in the future are also covered by the terms "passive attitude control" and "without active attitude control."

Other terms used in the description that follows are "data communications" and "routing messages." A "data communication" comprises content (digital or otherwise) sent over a radio link between satellites or between a satellite and a ground station, unless otherwise indicated explicitly or by context. While not limited as such, the systems described herein are particularly well suited for the transmission of data in packets, defined here in the generally accepted sense as a collection of digital data with a portion representing the content of the transmission (sometimes referred to as the "payload"), and a control portion (sometimes referred to as a "header" or "trailer"), which contains information enabling the payload to be delivered successfully, such as source and destination addresses, error detection codes, and sequencing information. A routing message is a radio signal sent from a node in the system (ground station or orbiting satellite) that contains information about the suitability of the node for inclusion in a multi-link radio route. A given radio signal can include both a routing message and a data communication.

A "node" is a physical object with transceivers for transmitting radio signals intended to be received by other nodes and for receiving radio signals transmitted from other nodes. Nodes can be ground-based ("ground node") or satellites in orbit around the earth (sometimes referred to as "linking nodes"). The description herein is based on using as orbiting nodes satellites in low-earth orbits at altitudes of approximately 500 miles or so, but the present system and methods are not so limited. In one variation satellites in very low earth orbits, in the range of 100-200 miles, can be utilized to increase the strength of radio signals reaching the ground. A ground station can either be structure actually on the ground or mounted on a low-flying drone maintained at a substantially fixed position at an altitude typically no more than about 500 feet. Drone-mounted ground stations will enable more users to connect to the system in areas of low population density and permit ground stations to be flown into otherwise Inaccessible areas.

As those skilled in the art will recognize, in the description of the subject matter disclosed and claimed herein control circuitry and components described and depicted in the various figures are meant to be exemplary of any electronic computer system capable of performing the functions ascribed to them. Such a computer system will typically include the necessary input/output interface devices and a central processing unit (CPU) with a suitable operating system and application software for executing program instructions. In addition, terms referring to elements of the system are used herein for simplicity of reference. For example, the terms "component," "module," "system," "apparatus," "interface," or the like are generally intended to refer to a computer-related entity, either hardware, a combination of hardware and software (firmware), software, or software in execution, unless the context clearly indicates otherwise. In addition, the term "module" or "component" does not of itself imply a self-contained structure, but rather can include various hardware and firmware that combine to perform a particular function. In that regard, a component or module may be, but is not limited to being, a process running on a processor, a processor, an object, an executable, a thread of execution, a program, and/or a computer. By way of illustration, both an application running on an electronic computing device and the device itself can be a component. One or more components may reside within a process and/or thread of execution and a component may be localized on one computer and/or distributed between two or more computers.

II. BASIC CONCEPTS AND PRINCIPLES OF SYSTEMS USING SATELLITE LINKING NODES

As already noted, a backbone of systems and methods described herein is a constellation of satellites as disclosed in the cross-referenced applications identified above. That is, the system comprises a large plurality of linking nodes, which can take the form of low-earth orbit satellites with the structure disclosed in those applications. The system described herein is concerned principally with creating satellite-to-satellite radio links, particularly for creating radio routes between ground nodes too far apart to support a radio route using a single satellite. It is understood that throughout the description herein, the term "radio" is not limited to references to electromagnetic radiation in frequencies commonly referred to as radio waves. It is meant to encompass electromagnetic radiation of any frequency capable of transmitting information, including light microwaves. VHF ("very high frequency"), UHF ("ultrahigh frequency"), etc.

Figure 1B:
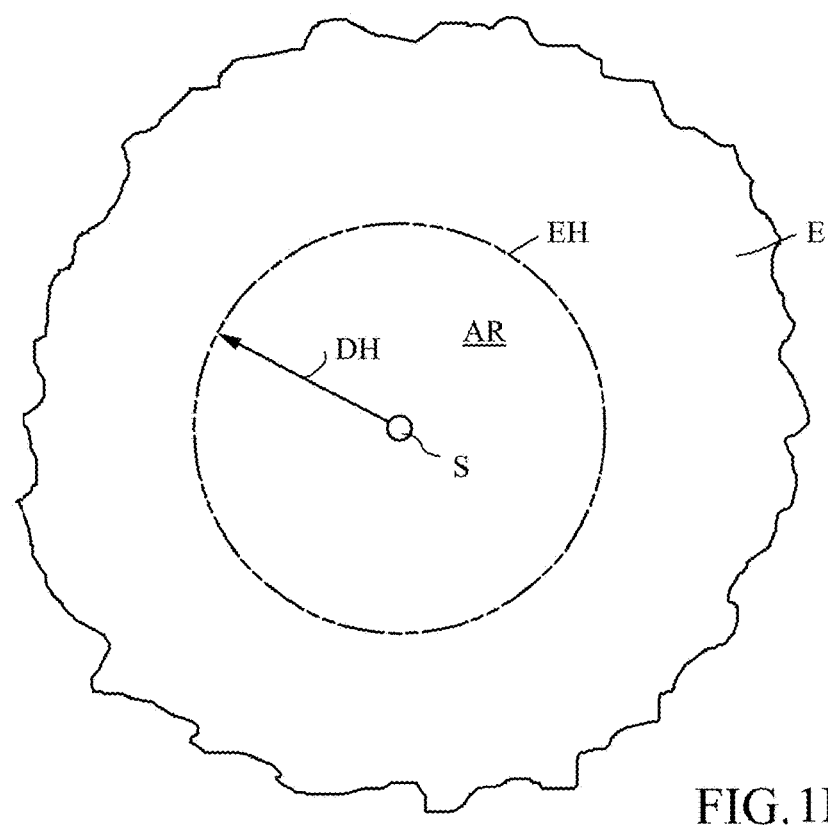

Embodiments of systems and methods that can bring Internet access to widely separated terrestrial locations uses a constellation of multiple satellites that are placed in random low-earth orbits at an altitude of about 500 miles. FIGS. 1A and 1B illustrate this principle graphically. The approximate distance DH to the horizon EH from a satellite S at an altitude AL of 500 miles can be calculated per the formula $DH=[(R+500)^2-R^2]^{1/2}$, where R is the radius of the earth E. Depending on the value chosen for R, DH is about 2000 miles. Thus, the area of coverage AR of a satellite is $\pi \times DH^2 \approx 12{,}500{,}000$ sq. mi. Taking the surface area of the earth as 197 million square miles, each satellite thus "covers" about 6% of the earth's surface, which means that on average any one point on the surface will "see" about 12 satellites (200×0.06). Conversely, the chance that a single satellite will not be visible from any particular point on the earth is 94%. If there are 200 satellites launched into random orbits that traverse the entire surface of the earth, the probability that any given point on the earth will not see at least one satellite is only 0.94200% 0.0004% (that is, four in a million). U.S. Pat. No. 5,566,354 includes a table, incorporated herein by reference, that shows the estimated probability of constant coverage over time of a point on the surface for different numbers of satellites.

The probability of a greater number of satellites in a given constellation being available for data transmissions can be realized by deploying the satellites within a swath of a certain latitudinal range, say between the Arctic and Antarctic Circles. This might decrease the number of satellites available over the poles, but the entire constellation would still be distributed over some 90% of the earth's surface. This would in turn increase the number of satellites likely to be within the line of sight of any given location on the earth's surface some distance beyond the Arctic and Antarctic Circles. Conversely, it would reduce the number of satellites necessary to implement the system. Since there are very few people living even farther north of the Arctic Circle, the only real impact of limiting global satellite coverage in this way will likely be outposts in the Arctic and Antarctic. And even then, as will be apparent as this description proceeds, they may at worst experience delays in transmitting and receiving data.

In another embodiment, the satellites can be deployed only in a swath between the Tropics of Cancer and Capricorn. For the same number of satellites, this would greatly increase the number that would be within line of sight of ground locations in places such as many countries in Africa, south Asia, and Micronesia lacking infrastructure supporting internet access to the degree found in more developed countries in the temperate zones between the Tropic of Cancer and the Arctic Circle and between the Tropic of Capricorn and the Antarctic Circle. Such a distribution would also increase the probability of successfully establishing satellite-to-satellite links. Alternatively, the number of satellites in the constellation could be reduced to make the system even less expensive. As discussed above, a constellation of satellites limited in latitudinal range are still considered to be in "random orbits" if they are otherwise deployed as discussed in the above definition of that term. In a preferred embodiment the number of satellites launched into orbit will preferably be in excess of a calculated number to enable continued full coverage of the chosen swath of the earth's surface by accounting for a certain number of satellite failures over time, or for satellites that are destroyed by reentry into the earth's atmosphere because of orbit decay or are damaged by space debris.

Another important feature of certain systems and methods described herein is that the satellites do not require onboard attitude control. Thus, they can be permitted to orbit without regard to their angular orientation. It is expected that satellites can deployed from a launch vehicle such as a space station or the like. It may be preferable in some implementations to attempt to deploy them with as little angular velocity as possible, but no special effort is required in that regard. Systems described herein can create radio routes even if the satellites tumble as they orbit, meaning that they need not be in a known, predetermined orientation. That the satellites can be in random orbits and have no active attitude control eliminates the need for heavy and costly onboard systems for operating onboard mechanisms such as rocket thrusters for changing or maintaining a satellite's location or attitude. If desired, each satellite can include tracking telemetry to detect when its orbit is decaying and it needs to be replaced, and to comply with any national or international protocols applicable to orbiting bodies. However, it is expected that it will be relatively simple and inexpensive to provide such telemetry.

A. Satellite Design: Antenna Configuration and Onboard Control Circuitry

Figure 2:
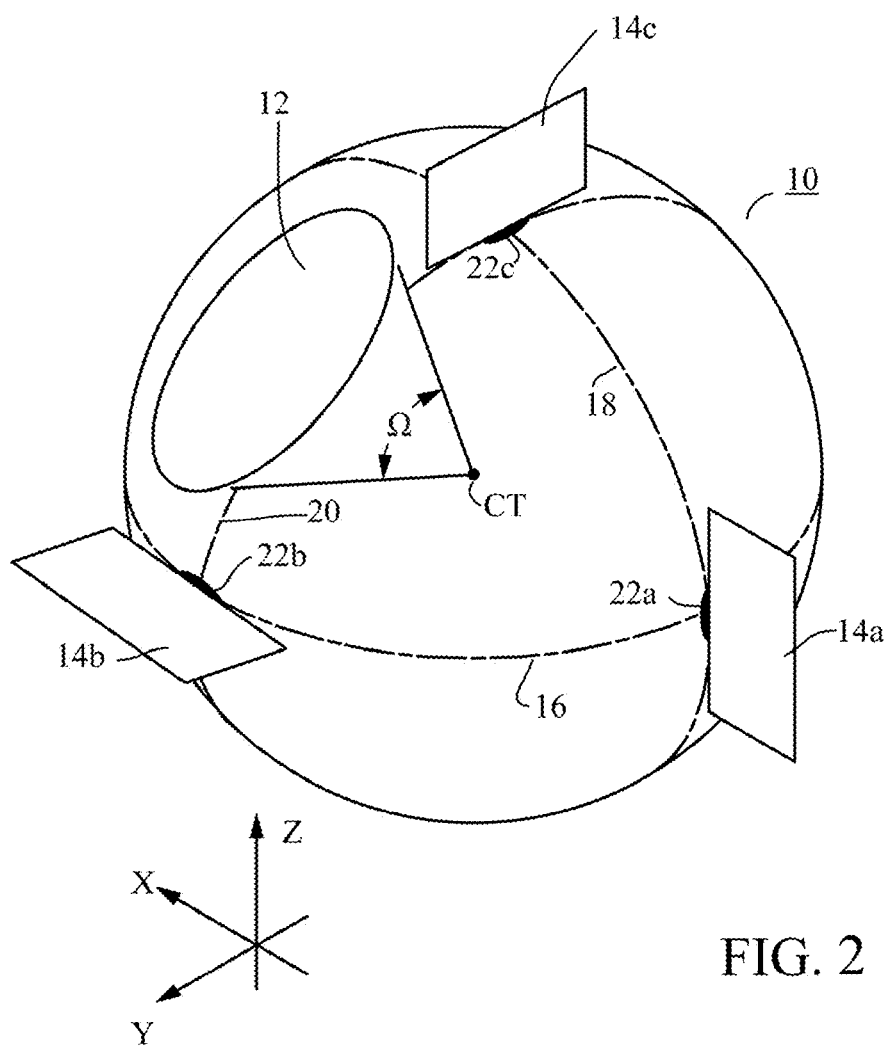

As already stated, linking nodes for the satellite-based system disclosed herein use satellites modeled after those disclosed in application Ser. No. 15/656,111 and Ser. No. 15/719,611. The descriptions of the satellites in those applications are Incorporated herein by reference as if set out in full. The following discussion also points out certain differences relevant to satellites used in the systems and methods disclosed herein. In that regard, FIG. 2 is a schematic depiction of an embodiment of a satellite 10 that can be used as a linking node in such satellite-based systems and methods. To facilitate understanding of certain principles underlying the operation of the satellite 10, it is shown with an outer casing 12 in the shape of a sphere centered at CT. Those skilled in the art will recognize that the satellite can have a different shape if so dictated by other design considerations. Certain features of the satellite will be described with reference to a coordinate system having mutually orthogonal x, y, and z axes, but this coordinate system is used strictly for purposes of illustration in describing features of the satellite. For example, the coordinate system imposed on FIG. 2 can be considered to be tied to the satellite and to change its angular orientation with respect to the earth as the satellite changes orientation.

The exemplary satellite 10 includes a plurality of antenna modules 12, one of which is depicted in highly schematic fashion in FIG. 2 for purposes of illustration. Each antenna module in this example comprises a directional antenna that transmits and receives radio signals at greater powers in predetermined directions. The present embodiment uses circular dish parabolic antennas each of which occupies a solid angle n with a vertex at the center CT of the spherical satellite. Typically, the antenna reflectors (omitted from the drawing for clarity) will be recessed below the surface of the satellite. The number of discrete antenna modules incorporated into the satellite will depend on the particular application of the system and the antenna design. In addition, the antenna modules can be structured as described in either of application Ser. No. 15/656,111 and Ser. No. 15/719,611, or any other configuration that will enable it to perform the functions described herein. In one embodiment $\Omega$ in steradians will be chosen so that a particular number of antenna modules, distributed around the satellite, will be capable of transmitting radio signals to and receiving radio signals from a sufficiently large spherical area to enable radio signals to be received from and transmitted to ground station transceivers and antennas in other satellites to effect operation of the system as described below. The actual configuration of the antenna modules 12 can be determined using known antenna design principles to achieve that goal.

A satellite used in the present system will be large enough to accommodate the various electronic and mechanical components required for satellite operation, discussed below in detail in connection with FIG. 3, as well as being sufficiently robust in construction to withstand the stresses of launch and long-term exposure to the hostile environment it will encounter in orbit. The '611 application describes various approaches for designing the satellites and their antennas, details being discussed further below in connection with FIG. 6.

It will be appreciated that satellites and antennas suitable for use in the present system can take different forms depending on trade-offs familiar to those skilled in engineering complex systems. As described further below in more detail, one of the aspects of certain methods described below involves transmission of radio signals from plural antennas in one or more satellites for receipt by antennas at other satellites. Increasing the number of antennas in a satellite linking node will increase the coverage of radio signals transmitted from and received by other linking nodes, which in turn will Increase the probability that a signal from one linking node will be received at another. It will be further appreciated that more antennas per satellite might make it possible to reduce the number of satellites placed in orbit. Such satellites might be more expensive and heavier, thus increasing launch costs, but other factors might offset the increased cost because fewer satellites might need to be launched. Those skilled in the art will also recognize that the system described herein can be implemented with satellite nodes having antenna collections that transmit with less than full 360° spherical coverage.

The satellite 10 also includes a plurality of solar panels, three of which 14a, 14b, and 14c, are shown in FIG. 2. In the illustrated embodiment the solar panels are oriented in mutually perpendicular planes and spaced equidistantly around the satellite 10. For purposes of describing the locations and orientations of the solar panels in this embodiment, a satellite equator 16 is defined as the great circle where the satellite surface is intersected by a plane parallel to the x-y plane and passing through the center CT of the sphere. A zero meridian 18 is defined as the great circle where the satellite surface is intersected by a plane parallel to the x-z plane and passing through the center CT of the sphere. And a normal meridian 20 is defined as the great circle where the satellite surface is intersected by a plane parallel to the y-z plane and passing through the center CT of the sphere. The solar panel 14a is attached to the satellite by suitable mounting structure 22a at the intersection of the equator 16 and the zero meridian 18. The solar panel 14b is attached to the satellite by suitable mounting structure 22b at the Intersection of the equator 16 and the normal meridian 18. And the solar panel 14c is attached to the satellite by suitable mounting structure 22c at the Intersection of the zero meridian 18 and the normal meridian 20.

The solar panels are generally planar with solar cells distributed over one or both faces for generating electricity when the solar cells are exposed to sunlight. For maximum effectiveness, the planar solar panels are mounted in mutually orthogonal planes to ensure that an adequate number of solar cells are exposed to sunlight regardless of the angular orientation of the satellite. In the depicted embodiment, the solar panel 14a lies in the x-z plane, the solar panel 14b lies in the x-y plane, and the solar panel 14c lies in the y-z plane. It will also be appreciated that the satellite includes three more companion solar panels where the equator, zero meridian, and normal meridian intersect on the other side of the satellite. The companion solar panels (depicted with a prime (') in FIG. 3) are preferably oriented in the same planes as each of their counterparts 14a, 14b, and 14c shown in FIG. 2. Each solar panel is depicted as being normal to the surface of the satellite so that it does not obstruct the transmission and receipt of radio signals by antennas adjacent to the solar panels.

It will be appreciated that FIG. 2 is intended solely to illustrate features of the satellite 10 necessary to an understanding of the present embodiment of the data communications systems and methods described herein. Those skilled in the art will understand that an actual satellite for implementing the present system may have design features not shown in FIG. 2's schematic depiction. For example, good design practice may dictate that the mouths of the antennas be recessed below the surrounding surface of the satellite to reduce the possibility of impact damage by space debris. Or additional protection might be provided by covering each antenna mouth (recessed or not) with a sheet of material transparent to signals transmitted by and received at the satellite. The design and placement of the solar panels 14 shown in FIG. 2 is also highly schematic, and the invention disclosed and claimed herein is not limited to any particular solar panel configuration, placement, or means of deployment. In another variation, the antennas can be arranged so that the solar panels can be mounted flush with the satellite surface in spaces between antenna mouths.

Figure 3:
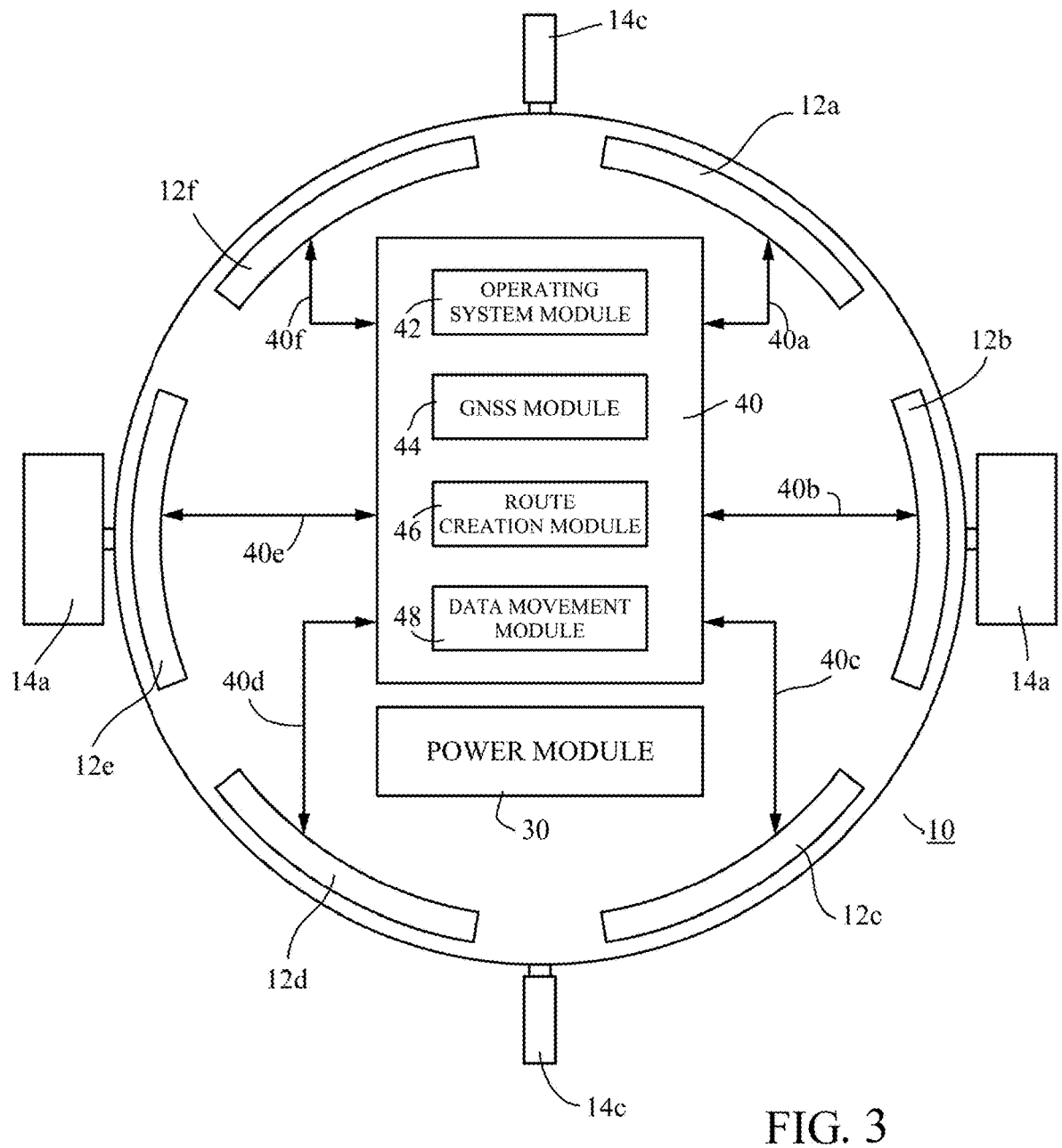
FIG. 3 is a representation of various operational components of the satellite depicted in FIG. 2.

FIG. 3 illustrates schematically various components housed by the satellite 10 (linking node) for creating a radio route capable of transmitting and receiving data transmissions to and from other nodes. As those skilled in the art will readily recognize, in the descriptions of this and other embodiments and aspects of the radio systems comprising the subject matter disclosed and claimed herein, the control circuitry and components described and depicted in the various figures are meant to be exemplary of any electronic computer system capable of performing the functions ascribed to them. Such a computer system will typically Include the necessary input/output Interface devices and a central processing unit (CPU) with a suitable operating system and application software for executing program instructions. In addition, terms referring to elements of the system are used herein for simplicity of reference.

Referring in more detail to FIG. 3, the satellite 10 is depicted in a view in the x-z plane in FIG. 2. It will be appreciated that FIG. 3, like other depictions used herein to describe the subject radio systems and their components, is not to scale. It depicts the solar panels 14a and 14c, as shown in FIG. 2, as well as the diametrically opposed companion solar panels 14a' and 14c' mentioned above. It also schematically depicts a plurality of antenna modules 12a, 12b, 12c, 12d, 12e, and 12f, intended as a schematic representation of all of the antenna modules onboard the satellite 10, for transmitting and receiving radio signals as discussed above in connection with FIG. 2. This schematic depiction is intended to convey the principle of operation of the present embodiment whereby the plurality of antenna modules in combination will be capable of transmitting and receiving radio signals to and from a node in multiple radial directions. (However, as already noted, the system described herein can also be implemented with linking nodes having antenna arrays that transmit with less than full 360° spherical coverage.) As already noted, further details regarding the structure of the antenna modules 12 are described below by reference to FIG. 6.

The satellite 10 includes a power module 30 capable of providing a reliable source of electrical power for operating the satellite components. The power module 30 includes rechargeable batteries that are charged by the electricity generated by the solar panels. Suitable power regulating equipment provides steady-state power to the various electronic components carried by the satellite even though the solar panels will spend one half of each satellite orbit out of sight of the sun. In addition to the power module the satellite includes a central processing unit 40 with an operating system module 42 that stores operational software for controlling the various functions of the satellite. As shown in FIG. 3, the CPU 40 is operatively connected to all of the antenna modules 12 via power and data links 40a, 40b, 40c, 40d, 40e, 40f, etc.

FIG. 3 also illustrates three main operational modules under the control of the operating system module. A GNSS module 44 communicates with a global navigation satellite system, examples being the Global Positioning Satellite (GPS) system based in the United States, the European Union's Galileo system, the Russian GLONASS system, and the Chinese BeiDou system. This module enables the satellite to determine its position relative to the earth's surface in the manner employed by known global navigation satellite systems. Radio signals exchanged between the satellites via the antenna modules 12 are used by a route creation module 46 that uses logic discussed further below to create a radio route for data communications between two or more satellites. A data movement module 48 controls the transmission of data (content) between satellites as also discussed further below in more detail. As suggested above, the illustration in FIG. 3 of separate modules for route creation and data movement does not necessarily imply that identifying radio links to be used in a radio route and transmitting data between linked satellites are other than part of a more or less unitary process of creating a preferred radio route for transmitting data communications from one satellite to another.

B. Satellite Features Facilitating Satellite-to-Satellite Radio Links

Launching sufficient numbers of the satellites 10 in random orbits as discussed above enables implementation of a variety of route creation strategies, discussed in section III. An important feature of the systems and methods described here is that each satellite stores in its route creation module 46 its position relative to the earth's surface as determined by its GNSS module 44. This enables implementation of several route creating techniques for building radio routes with reliable radio links between satellites.

Certain systems and methods described herein can be contrasted with the satellite radio systems and methods described in U.S. application Ser. No. 15/656,111 and Ser. No. 15/719,611 and international application no. WO 2018/039292. Those applications discuss creating radio routes by transmitting signals from one ground station to a plurality of satellites with onboard computers that execute methods seeking a preferred radio route to another ground station, either directly or via one or more other satellites with like computers. Data communications are then sent from the second ground station to the first over a radio route that utilizes particular antennas Identified during route creation to direct the communications back to the first ground station. A particular embodiment creates a single satellite route between two ground stations in a terrestrial area of a given size, using the country of Egypt as an example.

Those systems and methods are well adapted for creating radio routes between closer ground stations, say up to about 1,000 miles or so apart. But as the distances between the originating and destination ground stations increases, the number of satellites likely to be visible to both decreases. For example, in a system with 200 satellites, only three or four satellites will be likely visible at the same time between ground stations 2500 miles apart. Moreover, in reality the number is probably lower because satellites close to the horizon can be blocked from view by tall buildings near a ground station or features of the terrain (such as mountains)

close to a ground station. Systems and methods described herein use particular satellite infrastructures in combination with alternate route creation strategies to provide a radio route between ground stations via one or more satellite-to-satellite links. This will enable radio routes to be created if, for example, it is not feasible to use intermediate ground stations to relay transmissions or it is difficult to reliability create satellite-to-satellite links using techniques described in the inventor's prior applications cross-referenced above. Systems and methods herein facilitate satellite-to-satellite links without requiring that a satellite be in a known position relative to the other satellites or that it be maintained in a particular orientation.

III. ROUTE CREATION METHODS

The route creation methods discussed in this section utilize different embodiments of a satellite infrastructure as discussed above. Matrix and zone systems use a universal satellite Infrastructure in which each satellite stores in its route creation module 46 information concerning its own location relative to the earth's surface and information concerning the location of every other satellite in the constellation. A vector system uses a localized satellite infrastructure in which each satellite only knows its own location relative to the earth's surface. Creating a universal satellite infrastructure for the matrix and zone systems is described in the next section III.A. Embodiments of those systems are described in sections III.B. and III.C., respectively. A vector system is described in section III.D.

A. Creating a Universal Satellite Infrastructure

Figure 4:
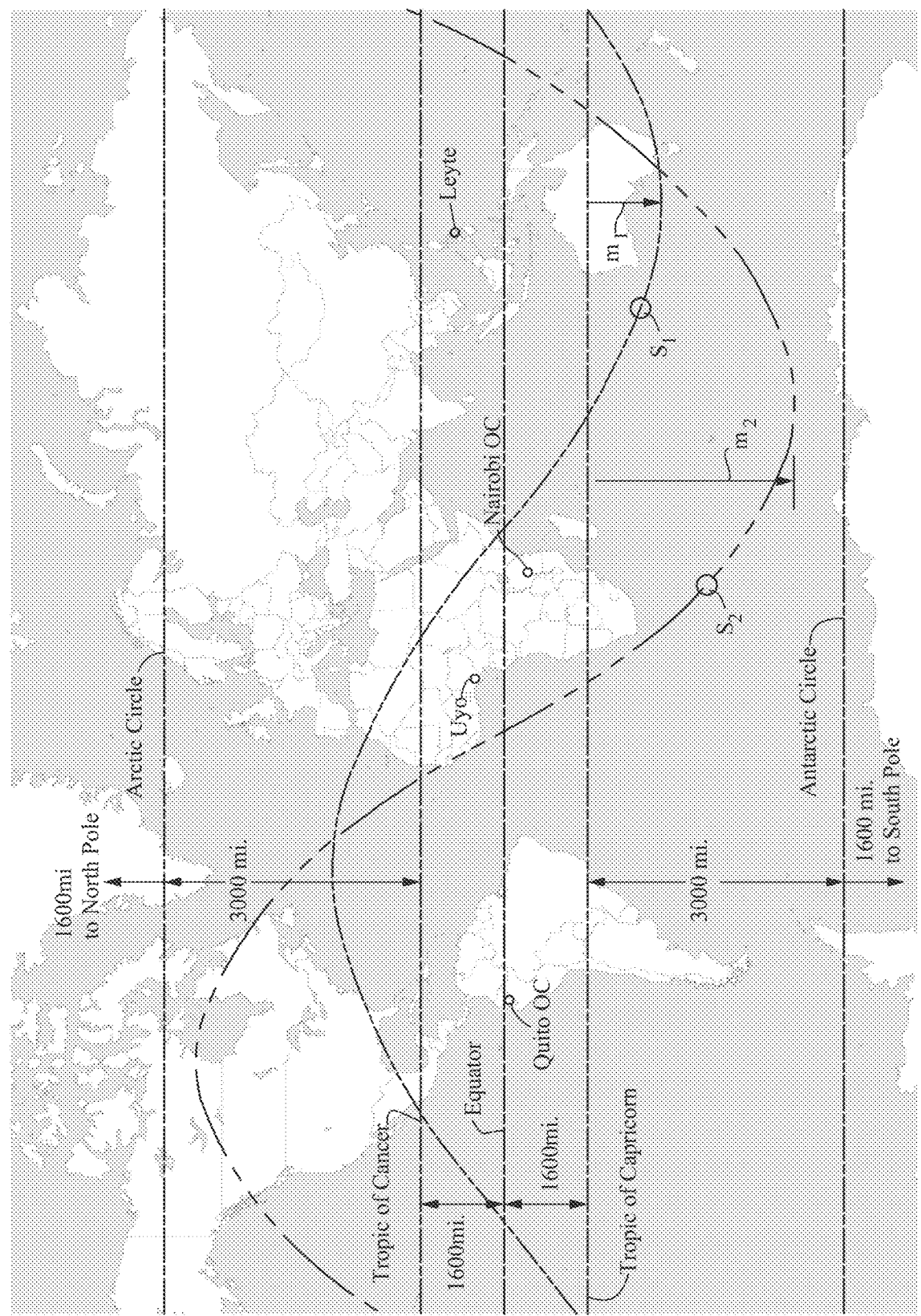
FIG. 4 is a Mercator projection of the earth showing one orbital traverse of two such satellites deployed in low-earth orbits used to illustrate principles underlying systems and methods for providing data transmissions over long distances in accordance with certain aspects of the present invention.

The creation of a satellite infrastructure in accordance with this aspect of the invention will be described with reference to FIGS. 4 to 6. FIG. 4 is a Mercator projection of the earth used to illustrate various principles underlying the systems and methods described herein. For reference, FIG. 4 includes a depiction in dash/single-dot lines of the Equator, the Tropics of Cancer and Capricorn, and the Arctic and Antarctic Circles, and indicates the nominal distances between these principal lines of latitude. The system typically employs a large number of satellites, the ground tracks of two of which are shown in FIG. 4. For purposes of illustration, the ground tracks are depicted as sine waves symmetrical about the Equator. A satellite $S_1$ is in an orbital plane depicted in a dash/two-dot line with an orbital angle of inclination that carries it a maximum distance $m_1$ from the Tropic of Capricorn. Satellite $S_2$ is in an orbital plane depicted by a dash/three-dot line with an orbital angle of inclination that carries it a maximum distance $m_2$ from the Tropic of Capricorn.

The number of satellites and the properties of their orbits are determined by the desired characteristics of the system. For example, the satellites are typically deployed in orbits that cause their ground tracks to shift relative to the earth's surface in successive orbits. This means that the track of every satellite will eventually cover the entire surface of the earth within a band determined by its maximum distance from the Equator. The satellites can also be deployed so that they are more densely distributed in random orbits in the swath of the earth's surface between the Tropics of Cancer and Capricorn. This will facilitate communications between less developed countries, which tend to be concentrated around the Equator. More developed countries in the temperate zones presumably have less need for a space-based system because of their extensive terrestrial communication infrastructure, so the number of satellites with angles of inclination that take them further from the Equator can be reduced in certain implementations of the systems and methods described herein. An alternate approach can incorporate a sufficient number of satellites that travel even further north and south to facilitate communications in the few populated areas close to or beyond the Arctic and Antarctic Circles. The satellites are in nominally circular orbits, but the systems described herein can create radio links between satellites at different altitudes at any particular instant.

As this description proceeds, it will be clear to those skilled in the art that the systems and methods described herein can be implemented with any number of orbital configurations tailored to specific performance goals of the system. However, a salient feature of all such orbital configurations is that the satellites are deployed without regard to any particular spacing, and that arbitrary numbers of satellites can be launched into different types of orbits. In other words, the satellites in all implementations of the present system are in random orbits as that term is used herein. Another salient feature of the system is that the satellites do not require active attitude control (as defined above) involving complex systems for precisely controlling their orientation in order to implement data transmissions between them. In an alternate implementation, described below in section IV.A., the satellites can be launched so that they rotate about an axis, which will enhance their ability to form beam matches to establish satellite-to-satellite links, in accordance with the description in the inventor's '611 U.S. application and WO '292.

This description uses as an example the creation of a radio route for data transmissions from Uyo, Nigeria to Leyte in the Philippines, about 8,000 miles away. As discussed above in a constellation of satellites in 500-mile orbits no single satellite will be in sight of both locations simultaneously. In addition, creating multiple single-satellite routes may not be feasible in view of the difficulty of providing a sufficient number of ground stations between the Uyo and Leyte given the expanse of Indian Ocean and sparsely populated land areas between them. Although satellite-to-satellite links can be established using the inventor's prior systems, the systems described herein increase the reliability and speed with which data can be communicated between locations too distant for a two-hop, single-satellite route.

1. Ground Stations Relay Orbit Parameters Between Satellites

A first way of constructing a universal satellite infrastructure, in which every satellite knows information about the orbit of every other satellite, will be described with reference to FIG. 5. In accordance with one embodiment, the satellite constellation comprises a plurality of n satellites $S_1$, $S_2, \ldots, S_n$, where $100 \leq n \leq 200$. However, the system is not limited to any particular number of satellites, and determining an optimum number of satellites for any given installation will depend on factors such as the amount of transit time required for a data transmission to reach a destination versus the number of satellites and how much of the earth's surface is to be served by the system. As noted above, each satellite's GNSS module 44 determines the satellite's position relative to the earth's surface. Plotting a satellite's position with respect to time for a sufficient period will enable calculation of its entire orbit and determination of where the satellite will be relative to the earth's surface at any given time. Information about each satellite's orbit is transmitted to every other satellite.

Figure 5:
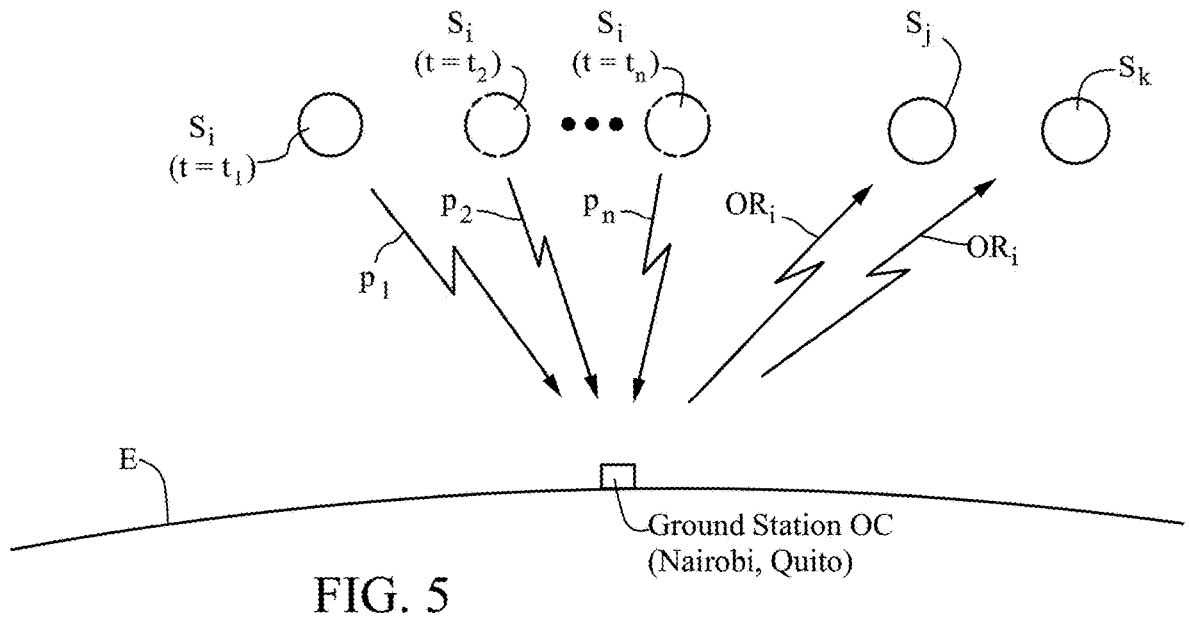
FIG. 5 schematically depicts information exchanged between satellites and ground stations to implement an embodiment of the present invention in which a satellite infrastructure is created from the constellation represented in FIG. 4 such that each satellite knows the parameters defining the orbit of every other satellite.

FIG. 5 illustrates one preferred method for transmitting orbital information about a given satellite $S_i$ to another satellite $S_j$. As already noted, the track of every satellite will eventually pass over every point on the earth's surface within the extent of the latitudinal swath shown in FIG. 4. For example, the satellites $S_1$ and $S_2$ will in the course of a sufficient number of orbits pass within sight of every point on the earth's surface within a band extending from respective distances $m_1$ and $m_2$ north of the Tropic of Cancer to respective distances $m_1$ and $m_2$ south of the Tropic of Capricorn, plus about 2000 miles further at each point of maximum distance from the equator (see FIG. 1).

As they orbit the earth E, the satellites S enter a region in which they are within the line of sight of one or more orbit-calculating ground stations OC that receive position signals p generated by the satellites' GNSS modules 44 and transmitted via one or more of their antenna modules 12. The ground stations preferably include one or more arrays of high gain, directional antennas of the type described in the above cross-referenced prior applications that enable them to pair readily with the satellite antennas in the manner described in those applications. In one embodiment the ground stations use multi-feed antennas like those described just below in connection with FIG. 6. The present example employs two such ground stations, one at Quito, Ecuador (Quito OC), and the other at Nairobi Kenya (Nairobi OC). Because the ground stations will typically incorporate advanced antenna construction and complex computer technology, they are preferably located in readily accessible areas to allow for ease of maintenance and upgrades to their hardware and computers. The orbit-calculating ground stations OC are preferably located as close to the equator as possible for reasons to be discussed.

The route creation module in each satellite stores the locations (latitude and longitude) of the orbit-calculating ground stations, which in one implementation are loaded into each satellite's route creation module 44 before the satellite is launched. Because the satellite knows its own location relative to the earth's surface, it can begin transmitting position signals to an orbit-calculating ground station OC as it enters its line of sight. The satellites can include sensors that interact with an external reference frame (for example, the horizon or the earth's magnetic field) that enable determination of a satellite's attitude at any given time. This will enable the satellite's route creation module 46 also to select the antenna modules 12 on which to transmit the position signals based on the satellite's position relative to the ground station, thus further ensuring their receipt by the ground station. In addition, all of the satellites and the orbit-calculating ground stations have timer circuitry that is maintained in synchronization with a master system clock, which can be based on the clock of the GNSS system.

The creation of a universal satellite infrastructure can be enhanced by improving the probability of successfully placing the satellites in radio communication with ground stations (and with each other) using certain antenna structures disclosed in the '111 and '611 applications, which are incorporated herein by reference. FIG. 6 is taken from the '611 application, and is a schematic depiction of the surface of a substantially spherical satellite $S_X$ that exemplifies the present embodiment. FIG. 6 represents in two dimensions the three-dimensional surface of the satellite, showing an array of satellite antenna modules SA that substantially cover the surface of the satellite. In this implementation, there are 25 antenna modules numbered SA1 to SA25 (only some of the antenna modules are depicted in the drawing.) In the portion of the satellite surface in FIG. 6, the entire antenna opening at the satellite surface is shown for antennas SA2, SA6, SA7, and SA12. The openings of the other antennas are partially shown, some of which are labeled in FIG. 6, such as, SA3, SA8, SA11, SA13, and SA18. It will be understood that this is an idealized representation, intended to indicate that it is preferable to make the satellite as small as possible consistent with the inclusion of the desired number of antennas as well as providing sufficient spacing between antenna openings at appropriate locations to mount solar panels 14 (see FIGS. 2 and 3).

To increase antenna gain, the antenna reflectors in the present embodiment are made as large as possible consistent with the other overall requirements of the system, such as limiting satellite weight and size to minimize launch costs. According to known principles of parabolic antenna design, the reflector should be at least one wavelength in diameter, preferably more. As an example, take antennas that transmit (and receive) in the microwave C band at 5 GHz and have 24 cm reflectors. If the feeds are located four wavelengths from the antenna reflectors, it is believed that a satellite with a diameter of about one meter (or comparable size if the satellite is nonspherical) will be able to meet realistic operational demands. However, it will be understood that operation of the system does not rely on using a particular antenna design, and those skilled in the art will be able to use known antenna design principles to provide a satellite with the capabilities required by the present system. Nevertheless, antennas with larger reflectors can be used to provide higher gains, and the satellites can be made correspondingly larger. Moreover, the amount of added weight will for the most part be attributable to the increase in the size of the satellite outer casing and the additional material needed for the additional feeds and larger reflectors (although satellite weight can be reduced if the reflectors have a mesh construction). Accordingly, satellites used in the present embodiment should still be extremely light in comparison to known communications satellites for all of the reasons already discussed above, a principal one among them being that they require no active orbit or attitude control.

Figure 6:
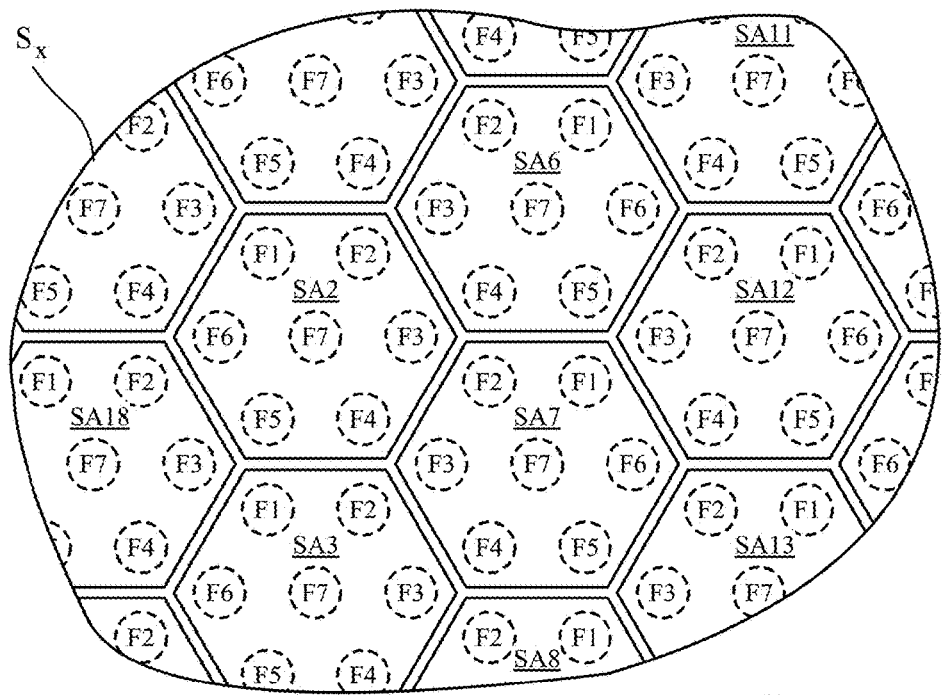
FIG. 6 is schematic two-dimensional depiction of a portion of the surface of a spherical satellite such as the satellite shown in FIG. 2, illustrating an antenna configuration for facilitating satellite-to-satellite radio communications.

In the present embodiment illustrated in FIG. 6 each of the antennas is a parabolic antenna with seven feeds F1 to F7. The feeds F1 to F6 are spaced equidistant from each other and are arranged at a distance from a central feed F7 at the antenna focal point, for reasons discussed in more detail below. The shape and curvature of the antenna reflectors can be chosen according to known multi-feed antenna designs and principles of operation. The hexagonal shape of the antenna openings is used in the figure to emphasize that the feeds F2 to F6 are displaced from the reflector focal axis. It will also be appreciated that the antenna reflectors can have non-parabolic topologies, such as spherical, combination spherical/parabolic, and others, to maximize the operational characteristics of the system embodiment described here. Examples of multi-feed reflecting antenna designs that those skilled in the art will be able to adapt for use in the present embodiment are disclosed in U.S. Pat. Nos. 3,815,140, 6,208,312, 6,219,003, and 9,035,839, the disclosures of all of which are incorporated herein by reference as if set out in full. It should be understood that the number of antennas and the number of feeds per antenna depend on the design of the satellites and the desired operational characteristics of the system. More or fewer antennas and feeds may be used within the scope of the present invention.

In a variation of this antenna configuration, each antenna has only one feed, such as the central feed F7. This will make the antennas less expensive and somewhat lighter (as noted above), but will concomitantly reduce the number of radio signals and transmission directions. As those skilled in the art will recognize, there will be certain trade-offs between the number of effective directional antennas and satellite cost and weight, depending on the requirements of a particular system. It will also be appreciated that the ground stations can have similar antenna structures, and may have even more directional antennas with more gain, since they do not have the same spatial and power constraints as the satellites.

Returning to FIG. 5 and the method by which the present embodiment creates a universal satellite infrastructure, the satellite $S_i$ transmits a first position signal $p_1$ at a time $t_1$ to a particular orbit calculating ground station OC within its line of sight. The satellite $S_1$ transmits a second position signal $p_2$ at a time $t_2$ to the same ground station, and continues transmitting to the ground station separate position signals up to an nth signal $p_n$ at a time $t_n$. Each position signal includes information identifying the satellite $S_i$ as its source. That is, each satellite has a unique identifier, typically a number. The orbit-calculating ground station OC uses the position signals to calculate one or more equations that define the orbit of the satellite $S_i$ in terms of its longitude and latitude as a function of time, and transmits the equations as orbit information signals 0% to other satellites such as the satellites $S_j$ and $S_k$ within its line of sight. The system master clock, with which all of the satellites and ground stations are synchronized, can be used to send position signals in different time slots to prevent them from interfering with each other.

Each time a transmission is made to or from an orbit-calculating ground station, the receiving node (satellite or ground station) returns a confirmation that the signal was received. This signal is typically transmitted from the antenna, or the particular antenna feed, on which the original signal was received. This allows the ground stations to ensure that a sufficient number of position signals have been received to calculate the necessary orbital parameters, and to inform the transmitting satellite that it does not need further position signals. It also lets the ground station know when a satellite has received the orbital parameters so that it no longer needs to keep sending them to that satellite. In an alternate embodiment, each satellite could be programmed to calculate its own orbital equations OR and transmit them to one or more ground stations at known locations, which in turn upload them to other satellites.

The same process is performed for every satellite in the constellation. It will take a certain amount of time for orbital parameters of each satellite to be transmitted to all of the other satellites, but the system can support data transmissions in accordance with the matrix and zone systems to be described before all of the satellites in the constellation are incorporated into the universal satellite infrastructure. For example, an embodiment with a constellation of 100 satellites should support at least some data transmissions after passage of enough time to permit each of a majority of the satellites to acquire orbital information defining the locations of the others. As more satellites in the constellation are added to the infrastructure over time, its ability to support data transmissions will continue to increase. In a preferred implementation the orbital equations OR of each satellite will be updated by the above procedure at given intervals, such as every tenth time it is within line of sight of one of the orbit-calculating ground stations. In addition, the information will be updated each time a new satellite is added to the constellation to replace a satellite that has fallen out of orbit or malfunctioned. However, it will be clear from the description further below that the system will be capable of data transmissions even if orbital equations of individual satellites change slightly, or if a replacement satellite is not immediately available for data transmissions.

Those skilled in the art will recognize that any number of orbit-calculating ground stations can be used, including only one. Likewise, those skilled in the art will understand that is preferable to locate the orbit-calculating ground stations as close as possible to the equator so that every satellite in the constellation will be able to communicate with orbit-calculating ground station(s) as it orbits the earth. (For example, an orbit-calculating ground station near London, England, would not be able to communicate with a satellite that only travels as far north as the Tropic of Cancer.) In addition the orbital track of a satellite advances along the equator a certain distance with each orbit because the earth is actually rotating beneath the satellite. A preferred arrangement comprises at least two ground stations within 1,000 miles of the equator, spaced by at least about 90° latitude. This will maximize the number of times that a satellite communicates with different orbit-calculating ground stations as it orbits, and increase the probability that the satellites will be able to exchange strong radio signals with more than one ground station, thereby minimizing the time required to distribute one satellite's orbital parameters to all of the other satellites. While the ground stations can be located farther north or south than certain satellites will reach in their orbits, such an arrangement would still require at least one ground station within the swath of the satellites orbiting closer to the equator.

2. Orbital Parameters Transmitted Directly Between Satellites

An alternate approach to creating a universal satellite Infrastructure for data transmissions using the methods described herein does not involve ground stations for distributing each satellite's orbital equations to all of the other satellites. In this approach the satellites communicate their orbital information directly to one another. This might take longer to distribute orbital information to all of the satellites in the constellation, but it will eliminate the expense Involved in building, maintaining, and staffing ground stations for relaying signals between satellites.

The satellites are still given unique identifying numbers and have clocks synchronized to a master clock, preferably the GNSS clock. As noted above, each satellite's route creation module 46 is programmed to calculate its orbital equations using position and time Information obtained from the global navigation satellite system. At a given time Interval, say once every 24 hours, constellation time $C_t$ is set to zero. (That is, every satellite sets $C_t=0$.) Every satellite then takes a turn transmitting its own orbital parameters OR during an orbit transmission Interval. As an example, assume that satellite $S_1$ transmits its orbital parameters $OR_1$ on a plurality of its antennas between $C_t=0$ and $C_t=30$ sec. Next, $S_2$ transmits its orbital parameters $OR_2$ on a plurality of its antennas between $C_t=1.0$ min. and $C_t=1.5$ min. The serial transmissions of orbital information continue until all of the satellites in the constellation have transmitted orbital Information. If there are 200 satellites, one cycle should take less than four hours. In addition, each satellite not only transmits its own orbital information during its time slot, but also transmits any orbital information it received from other satellites.

The principle involved can be illustrated by assuming that each satellite has about 40 other satellites within its line of sight. This assumes that each satellite can "see" about 3,500 miles over the horizon. FIGS. 1A and 18 illustrate this point, showing that a satellite can theoretically see for 4,000 miles (2 times DH, which is 2000 miles.) However, a conservative estimate of 3,500 miles will take into account surface features such as a mountain range at a satellite's horizon.

The area covered by a circle with a radius of 3,500 miles is about 40,000,000 sq. mi. The earth's surface is roughly 200,000,000 sq. mi., which means that on average a satellite sees 20% (40,000,000/200,000,000) of the 200 satellites in the constellation. This percentage will be higher for the same number of satellites in random orbits around certain latitudinal swath of the earth. Nevertheless, since antennas on the transmitting and receiving satellites have to align for successful data transmission, a given satellite might successfully transmit information to only four or so of the 40 or more satellites in its line of sight.

If, say, the satellite $S_1$ transmits its orbital parameters $OR_1$ during its orbit transmission interval $C_t$=0 to $C_t$=0.5 min., that information might be received by the satellites $S_{56}$, $S_{79}$, $S_{102}$, and $S_{164}$. (These satellite numbers are used for this example only; they do not correlate with the satellite distribution shown in FIG. 8 discussed further below.) The satellite $S_{56}$, will transmit Its orbital parameters $OR_{56}$ during its orbit transmission interval $C_t$=55.0 min. to $C_t$=55.5 min. However, it will also transmit the orbital information $OR_1$, as well as any orbital information it has received from the satellites $S_2$ to $S_{55}$ from $C_t$=1.0 min. to $C_t$=54.5 min. The amount of time it will take for the orbital information to distribute itself throughout the satellite constellation is indeterminate since the satellites are themselves in indeterminate orbits. However, it is possible to increase the likelihood of successful transmission of orbital information between satellites in a number of ways. Using the antenna arrangement discussed above in connection with FIG. 6 can increase the probability of successful satellite-to-satellite beam matches. If later developed technology permits the satellite attitude to be controlled within close tolerances, only a selected number of the antennas on a satellite can be used to transmit the orbital information, thus enabling the transmission of signals with a higher gain using the same total amount of electrical power.

The probabilistic nature of the method means that the number of satellites with orbital information on all other satellites increases asymptotically with time toward the total number in the constellation. However, it is expected that a sufficient number of satellites will have orbital information on other satellites in a 200 satellite constellation to at least begin supporting data communications after several days. One estimate is that at least 100 out of 200 satellites in a constellation will have orbital information on each other in no more than 72 hours. The actual time will vary and will be established after experience as more and more systems are deployed. Successful data communications using the systems and methods to be described below depend in large measure on the number of satellites "visible" to any given satellite seeking a radio link to another satellite. As noted above, probabilities suggest that about 40 satellites will be in line of sight with a given satellite at all times. If the satellite seeking a radio link doesn't have the orbital information for one or more of those 40 satellites, successful data transmission is still possible. Likewise, a data transmission from any given satellite Is likely to be received by a plurality of the 40 satellites within its visual range. If a satellite receiving a data transmission has no orbital information on other satellites, another of the satellites that received the data transmission will likely have such information. In one implementation of the system, the satellites continue to intermittently transmit their orbital information at predetermined intervals, say, every hour, to complete the satellite infrastructure as well as to incorporate any newly launched satellites into the Infrastructure and account for gradual changes in the orbits of the satellites due to orbital decay and the like. In this aspect, the constellation performs as a functional blockchain in that every satellite knows the orbital information of every satellite, updates it for every satellite upon any orbital changes in one of them, and a transmission by one satellite can provide orbital information on all of them to a new satellite.

Figure 7:
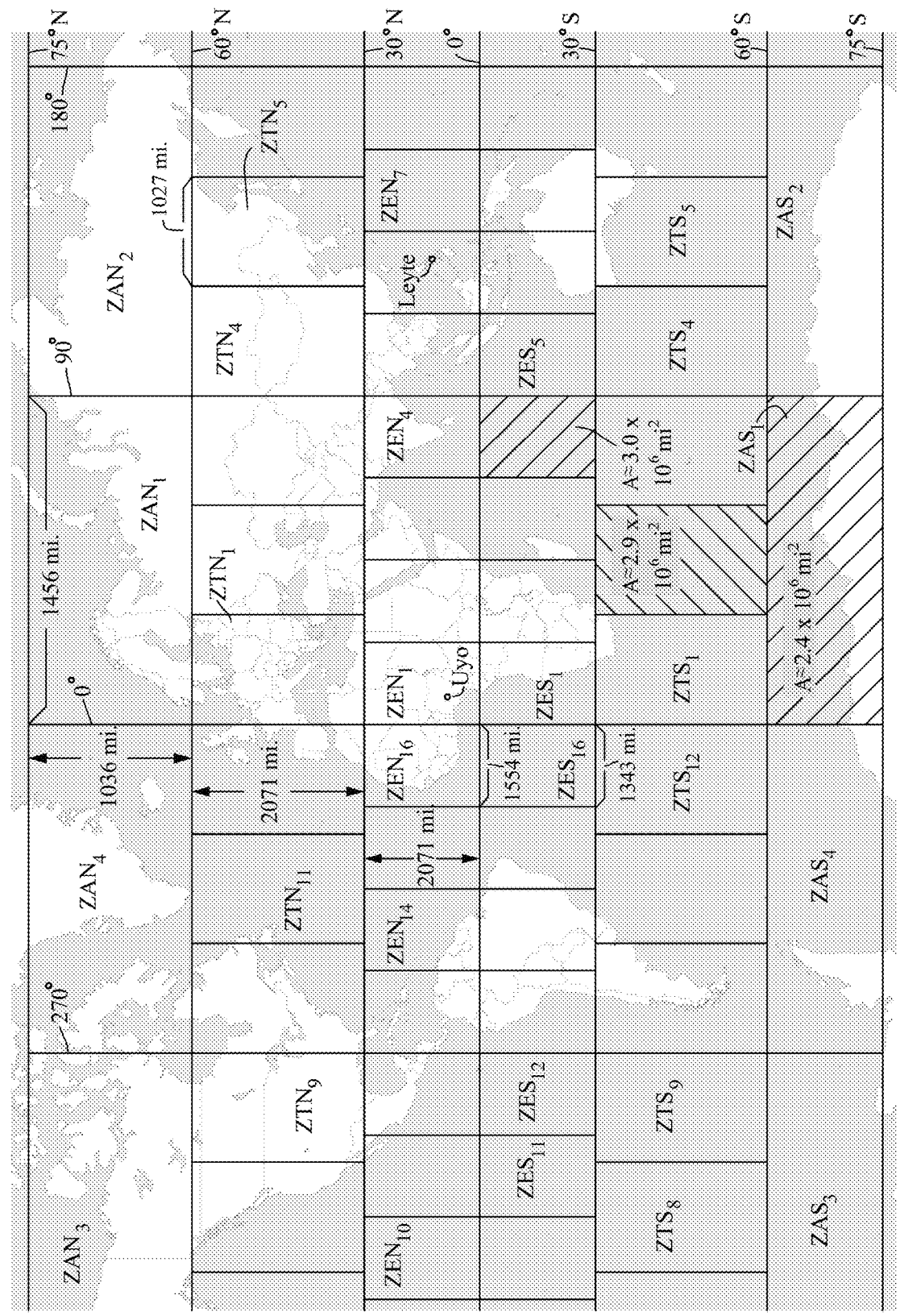
FIG. 7 shows the earth's surface divided into zones to illustrate the establishment of satellite-to-satellite links in accordance with certain embodiments of the present invention.

B. Zone/Matrix Systems for Creating Radio Routes with Satellite-to-Satellite Links FIG. 7 is a Mercator projection of the earth's surface divided into a plurality of zones. In this example, there are 60 zones of between 2,500,000 and 3,000,000 sq. mi. each. In the illustrated embodiment, there are 16 zones ZEN in a band between 0° and 30° latitude (north), each one being 22.5° in longitude wide. There are a corresponding number of zones ZES in a band between 0° and 30° latitude (south), each one likewise spanning 22.5° in longitude. The swath between 30° latitude (north) and 60° latitude (north) is divided into 12 zones ZTN, each one spanning 30° in longitude, and a corresponding number of zones ZTS in a band between 30° latitude (south) and 60° latitude (south). Finally, a swath between 60° latitude (north) and 75° latitude (north) is divided into four zones ZAN, each spanning 90° in longitude, and a corresponding number of zones ZAS between 60° latitude (south) and 75° latitude (south). To avoid confusion, only some of the zones are labeled in FIG. 6. Each of the zones is assigned a unique identifier. In the present example, the zones are numbered starting with the number 1 at 0° longitude: $ZEN_1$, $ZEN_2$, ..., $ZEN_{16}$; $ZTN_1$, $ZTN_2$, ..., $ZTN_{12}$; $ZAN_1$, $ZAN_2$, $ZAN_3$, $ZAN_4$; $ZES_1$, $ZES_2$, ..., $ZES_{16}$; $ZTS_1$, $ZTS_2$, ..., $ZTS_{12}$; $ZAS_1$, $ZAS_2$, $ZAS_3$, $ZAS_4$. The polar regions are omitted from this example to simplify the following explanation of various route creation systems and methods, but those skilled in the art will understand how to extend those methods and systems to include the polar regions. The zone dimensions shown in FIG. 7, and discussed elsewhere herein, are meant as examples only. It is believed, however, that the zone systems described herein will provide optimum performance if all of the zones have an area of at least 1,000,000 sq. mi.

The length of the boundaries of each zone is indicated in FIG. 7. If each zone is considered to be approximately trapezoidal in shape, the area of each zone ZE is about 3,000,000 sq. mi., the area of each zone ZT is about 2,900,000 sq. mi., and the area of each zone ZA is about 2,400,000 sq. mi. (The area of a polar zone is about 16,000,000 sq. mi.) The present example will consider transmitting a data communication from Uyo, Nigeria, to Leyte, Philippines, using a 200-satellite constellation. For purposes of applying the calculations presented above and in reference application no. 656,111, the area of a typical zone (other than the polar zones) is taken as 3,000,000 sq. mi., and the area of the earth, minus the polar zones, is taken as approximately 168,000,000 sq. mi. so that each zone represents about 1.8% of the earth's surface, which means on average there will be 3% satellites in each zone (200×0.018). Conversely, the chance that any particular zone will not contain at least one satellite is $0.982^{200}$=0.025 (that is, about 1 in 40). However, a node on the ground will still "see" on average at least 10 satellites at any given time, with a probability of about four in a million that it will not see at least one satellite. Accordingly, the probability of being able to successfully complete data transmissions between ground nodes and at least one of the 200 random orbit satellites will be the same as in the inventor's previous satellite radio systems. Every satellite's route creation module 46 stores latitude and longitude information defining the boundaries of the zones and the zone identifiers. Thus, the route creation circuitry in a satellite can calculate which particular zone that satellite occupies at any given instant. Extending the boundaries of the temperate zones ZTN and ZTS to extend a certain distance into the respective polar regions does not substantially affect these calculations.

Figure 8:
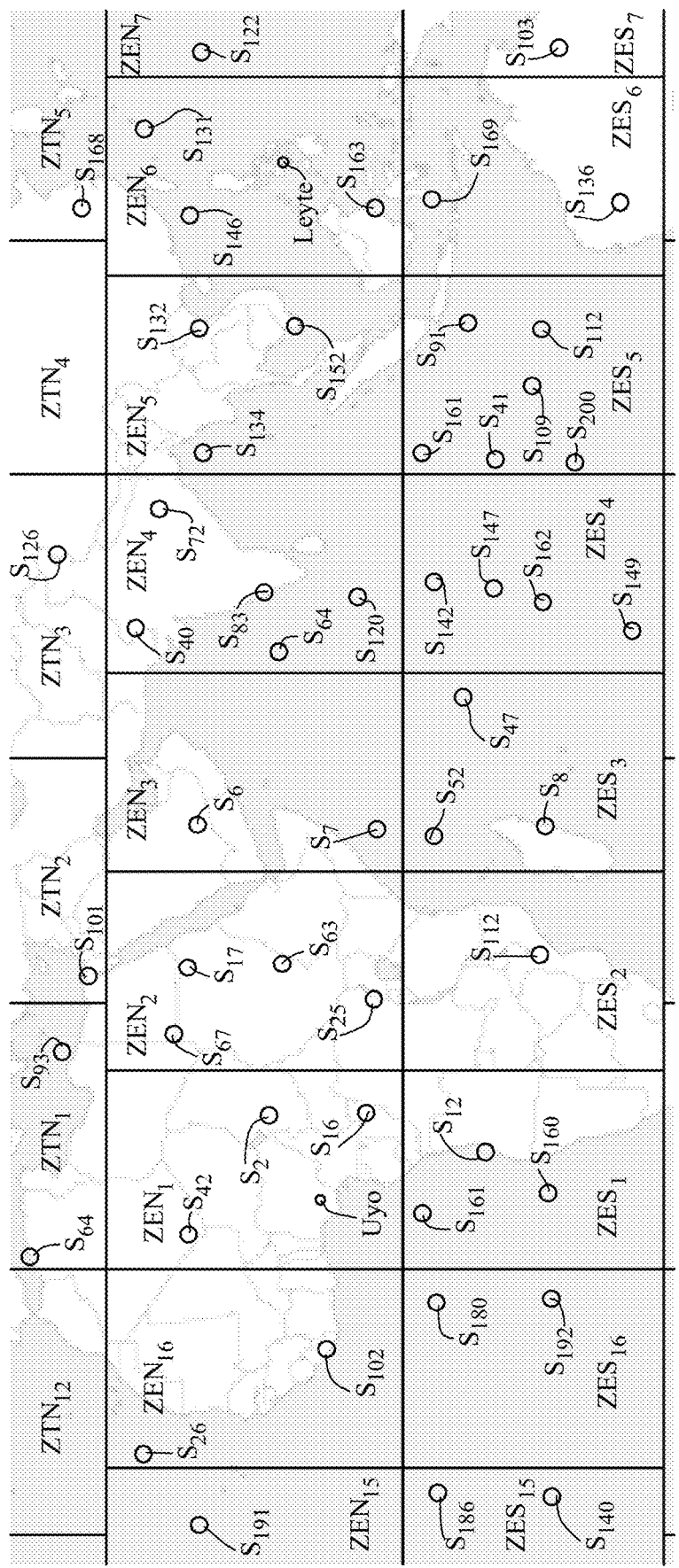
FIG. 8 represents a portion of FIG. 7 illustrating a plurality of orbiting satellites S located over a portion of the earth's surface at a particular instant.

FIG. 8 illustrates a plurality of orbiting satellites S located over a portion of the earth's surface between Uyo, Nigeria, and Leyte in the Philippines at a particular instant. It will be understood that the satellite distribution shown in FIG. 8 will change over time, and because the satellites' orbits are not controlled, the number at any given time can be greater or less than that depicted. In other words, satellites leave and enter a particular zone over time, and an important feature of the systems described herein is that they can create satellite-to-satellite radio links even though the satellites are moving relative to each other and the earth in an essentially random manner. The satellite distribution depicted in FIG. 8 is based notionally on a 200-satellite constellation, wherein each satellite knows the orbital parameters of the others per the above description, with the satellites in orbital planes as discussed in connection with FIG. 4. The zone/matrix system of creating radio links between satellites will be discussed in the context of providing a route for data communications over the approximately 8,000 miles from Uyo to Leyte.

The following descriptions of route creation systems and methods make some assumptions to aid in understanding the principles involved. The first assumption is that a ground station node at Uyo uses an antenna construction such as that shown in FIG. 6. For example, the ground stations will have multiple directional parabolic antennas pointing upward in all directions, and each antenna will preferably incorporate multiple feeds for a given reflector. The satellites will likewise have multiple directional antennas of similar construction for transmitting and receiving in all directions, at least in implementations in which satellites' attitudes are not known. To start, the ground station at Uyo will transmit a data communication from all of its antenna feeds. In the present embodiment the data transmission will be in packet form with address information designating the destination of the transmission. The address will include the personal address of a recipient individual at Leyte (similar to the familiar form of email address presently used) and the longitude and latitude of the Leyte ground station serving that individual. If the longitude and latitude information is in tenths of seconds of arc, the location will be known to within about 10 feet.

With directional antennas such as those described above, a radio signal transmitted from the Uyo ground station will be received by at least one satellite within sight of the ground station, which continues to broadcast from all of its antennas until it receives a confirmatory handshake signal from at least one satellite. This handshake signal can include additional information, such as the receiving satellite's distance from the Uyo ground station or the strength of the radio signal received from the Uyo ground station which can be used by the ground station to select which of multiple satellites that received the transmission should initiate the route creation/data transmission process. The ground station uses the antenna feed on which it received the selected handshake signal to upload the data transmission. The present example assumes that the satellite $S_{16}$ in FIG. 8 comprises the first satellite in the radio route to Leyte. The next assumption is that only satellites depicted in the band of zones $ZEN_{16}$, $ZEN_1$, $ZEN_2$, $ZEN_3$, $ZEN_4$, $ZEN_5$, and $ZEN_6$ will be considered for inclusion in the route. This assumption Is made solely to simplify the description of the steps involved in route creation, but it will be clear to those skilled in the art that route creation according to the zone/matrix system is not limited to using satellites within any particular area between the originating and destination ground locations.

The significance of the zone/matrix systems described herein can be appreciated by contrasting them with known techniques for assembling routes through multi-node terrestrial mesh networks. The prior art discloses computational approaches capable of calculating routes from any given node to every other node in such networks. One such approach utilizes the Bellman principle of optimality to determine optimal routes from originating nodes to destination nodes in terrestrial networks such as those described in the inventor's U.S. Pat. Nos. 5,793,842 and 6,459,899. (An "optimal" link can mean one with the highest signal strength, the shortest distance, the highest signal-to-noise ratio, or any other property selected to reflect the suitability of two links relative to each other.) These types of approaches are at least in theory available for determining an optimal route from one satellite to another, far-distant satellite in the 200-satellite constellation of the present system (such as Uyo to Leyte). However, they would require considering all possible satellite-to-satellite links for inclusion in such a route. While some of the calculated satellite-to-satellite links can be discarded from consideration as part of a potential multi-satellite route—for example, if a potential link would involve a satellite pair too far apart to communicate with each other—all 200 satellites still should be considered by the route-creating logic as candidates for inclusion in such a route. That approach is further complicated because, unlike terrestrial networks, the satellite nodes are moving at approximately 15,000 miles per hour, so that the satellites to be used for a particular route must be identified quickly enough to enable transmission before they move from the positions for which the route was calculated. Coupled with the fact that a workable system will have to support the simultaneous creation of routes between multiple destinations, it will be apparent that a route creation method that involves consideration of all of the satellites in the constellation is most likely not feasible. By the same token, since route creation in the present system depends on using a sufficient number of satellites to provide a high probability that satellite-to-satellite links will be available for all possible routes, the calculation cannot be simplified by reducing the number of satellites in the constellation.

1. Full Zone/Matrix System

Implementation of the zone/matrix system described here relies on the fact that the GNSS module 44 in the satellite $S_{16}$, which can be denominated more generally as the initial routing node, knows the satellite's position and its route creation module 46 can determine the distance and direction to all other satellite nodes in the 200-satellite constellation, as well as the zone that it occupies. It can thus identify which satellites are candidates for inclusion in a route to Leyte. FIG. 9 illustrates a matrix constructed by the route creation module software in the satellite $S_6$ that includes the relative positions of all of the satellites shown as occupying the 0° to 30°N band including the zones $ZEN_{16}$, $ZEN_1$, $ZEN_2$, $ZEN_3$, $ZEN_4$, $ZEN_5$, and $ZEN_6$. The matrix Includes entries for the distances in miles between all 22 of the satellites in the band of interest starting with the initial satellite $S_{16}$ and then listed in generally in order in an easterly direction starting with the satellite $S_{26}$ and ending with the satellite $S_{163}$, which being the closest to the Leyte ground station, will be determined by the satellite $S_{16}$ as the terminus of the communication route. For clarity of Illustration, the distances shown in FIG. 9 are approximate some of the mileages between the satellites are omitted for clarity. Although also omitted from FIG. 9 for ease of illustration, each entry in the matrix also includes the zone occupied by the satellites at the time the matrix is constructed by the route creation module in the satellite $S_{16}$.

By dividing the earth's surface into zones, and uploading the zones' boundaries to all of the satellites, the number of calculations can be substantially reduced even using known approaches for route creation through distributed nodes. In the present example the route creation software in the satellite $S_{16}$ determines the zones to which the limited route determination method will be applied by "drawing" a routing line to the zone on the earth's surface where the destination ground station is located. The method is then applied by constructing a matrix like that in FIG. 9 with entries for all of the satellites in the zones in the direction along the line to the destination, plus one zone in the opposite direction. In the present example, a line from Uyo to Leyte traverses the zones $ZEN_1$, $ZEN_2$, $ZEN_3$, $ZEN_4$, $ZEN_5$, and $ZEN_6$, and the matrix includes all of the satellites in those zones, plus the zone $ZEN_{16}$ in the opposite direction. In this way the number of possible intersatellite links is reduced to 21×21 (=241), or about 0.6% of the number required in working with a 200×200 matrix (=40,000). Note that each link must be considered twice, once from a satellite $S_L$ to a satellite $S_R$, and then from the satellite $S_R$ to the satellite $S_L$ since the route creation logic will have to take into account the bi-directional nature of the potential satellite-to-satellite links. Including them in the matrix twice will reduce the number of calculations necessary to construct the link-to-link subroutes. As noted above, many of the potential links can ultimately be discarded using various strategies, such as filtering those that exceed a predetermined distance between the satellites in a given link, but they still should be calculated.

In a variation of this approach the matrix can include additional information that the route creation software can use to increase the probability of creating the necessary satellite-to-satellite links required to complete a data transmission to a satellite that can download it to the Leyte ground station. In one such variation the matrix not only includes the distance between satellites but also their velocities relative to each other and the direction in which they are moving (for example, toward or any from each other). The route creation module in the satellite can take that information into account when calculating routes to the ultimate destination of the data transmission. In a preferred embodiment the matrix shown in FIG. 9 is refreshed at intervals, say every 10 seconds, to account for movement of the satellites. During route creation in the zone/matrix methods described herein, each satellite receiving a routing message transmits a routing confirmation signal to the satellite from which it received the routing message. The satellite that receives the routing confirmation signal stores the antenna (or antenna feed; see FIG. 6) on which it received the routing confirmation signal for use in transmitting the data packets between the satellites along a particular route.

To summarize, when the satellite $S_{16}$ receives the data transmission from the Uyo ground station, it calculates the satellite-to-satellite route to the Leyte ground station based on the latitude and longitude address information included in the data transmission. By limiting the number of calculations required to determine all possible routes, the routes can be determined virtually instantaneously, or at least rapidly enough that it does not result in perceptible delays in transmitting the data to its destination. (This also limits the amount of computing capacity of the route creation module needed to create a given route, leaving sufficient overhead for calculating other routes in which the satellite is a node candidate.) If the first two satellites in a route are $S_2$ and $S_6$, the satellite $S_{16}$'s data movement module 48 sends the data transmission packet it received from the Uyo ground station to the satellite $S_2$, on the antenna (or antenna feed) it stored during route creation, along with an addressing signal Instructing the satellite $S_2$ to send it in turn to the satellite $S_{67}$, and so forth. Each routing message can include the location of the next satellite node in the route to eliminate the need for the receiving satellite to calculate the next satellite's location. When the destination ground station receives the complete data transmission, it returns a confirmation message to the originating ground station via a satellite-to-satellite route created in accordance with any of the methods described herein.

In a variation on this embodiment, the route creation module of the initial receiving node calculates plural routes to the destination ground station. Since a given multi-packet data transmission will include information regarding the proper order of the packets, they can be assembled at the destination ground station even if they arrive out of order. This will increase the probability that a complete data transmission will be received at the destination ground station even though the satellites are not constrained to particular orbits. Additional reliability can be provided by applying well known error coding techniques to the data packets.

It will also be appreciated that the zones can be "drawn" or "redrawn" by uploading information from ground stations in similar fashion to the manner in which the satellites' orbital parameters were distributed throughout the constellation as described above. The satellites can also distribute zone boundary definitions among themselves, also in the manner described above. Each route is determined based on the location of the destination ground station relative to the location of the initial node in the route. The particular zones to be used to construct a matrix like that in FIG. 9 will be determined on the same basis. The present example uses the distance between satellites to assemble preferred routes, but the matrix in FIG. 9 can be based on other properties of the potential satellite-to-satellite links, such as signal strength, signal-to-noise ratio, relative velocity of the satellites (as already noted), or any combination of two or more of such parameters. The computer in the satellite then calculates a quantitative figure of merit for every link based on the values in the matrix for each potential link. Another feature of the satellite-to-satellite systems described in this and the following sections is that distributing the satellites' antennas to transmit and receive over at least a portion of the spherical space surrounding each satellite facilitates beam matching between satellites if they are at slightly different altitudes due to their orbits being slightly non-circular at deployment, through orbital decay, or if they were deployed at slightly different altitudes by different launch vehicles. This ability is further enhanced if some or all of the satellites include multi-feed antennas such as those described in connection with FIG. 6. The antennas can be arranged to transmit and receive over a predetermined portion of a satellite if it is equipped with attitude control. In another adaptation, the knowledge of a particular satellite of its own location and the location of a satellite from which it received a radio signal will enable the receiving satellite to determine its attitude based on the one or more antennas (or antenna feeds) on which the radio signal was received. This information can be used by the route creation module to determine which antenna(s) or antenna feed(s) to use for transmitting radio signals to other satellites or to ground stations. This adaptation can be used in satellites with or without attitude control.

2. Limited Zone/Matrix System

This method of route creation further decreases the number of calculations by considering a first group of zones separately. In this example, the satellite $S_{16}$ assembles an 8×8 defined distance matrix from the satellites in the first three zones $ZEN_{16}$, $ZEN_1$, and $ZEN_2$, namely itself and the satellites $S_{26}$, $S_{102}$, $S_{42}$, $S_2$, $S_{67}$, $S_{25}$, $S_{17}$ and $S_{63}$. This matrix is shown by the heavier lines in FIG. 9. Suitable route creation software in the satellite Sib is used to calculate preferred subroutes to all of the other satellites in the zones $ZEN_{16}$, $ZEN_1$, and $ZEN_2$. As before, the criteria for a suitable multi-link subroute can be one or more parameters such as the combined distance of the links in the subroute, the quality of the satellite-to-satellite links as indicated by a quantitative figure of merit based on factors such as signal strength, the direction of the relative velocity vector between any two particular satellites, etc.

The next step in the limited zone/matrix method is to eliminate from consideration all subroutes that terminate at nodes in the zone along the routing line in the opposite direction from the destination ground station, which in the present example constitutes the satellites $S_{102}$ and $S_{26}$ in the zone $ZEN_{16}$. This strategy reduces the number of calculations that will be required as the route creation process proceeds toward the zone $ZEN_6$, even though there is a slight chance that such subroutes might have subsequently been determined to be part of a preferred subroute to other satellites in the downstream zones during subsequent steps in the process. However, it is believed that the probability of the method identifying such a subroute is sufficiently low that it is unlikely that such subroutes would have been included in any potential final route. In this example, in which the criteria for inclusion in a route is minimum distance, there would be no multi-link subroutes from $S_{16}$ to either $S_2$ or $S_{42}$, since all other subroutes involving $S_{102}$ or $S_{26}$ would be longer than the direct $S_{16}$ to $S_2$ link or the direct $S_6$ to $S_{42}$ link. If another parameter were used, such as signal strength, the subroute to $S_{42}$ through $S_2$ could be preferred over a direct link to $S_{42}$, or a subroute to $S_{42}$ might include $S_{102}$.

The route creation process then proceeds in the following manner:

The satellite $S_{16}$ identifies preferred subroutes from the subroutes ending at satellites in the zones $ZEN_1$, and $ZEN_2$ selected in the above steps to all of the satellites in the next zone $ZEN_3$ along the routing line toward the destination zone ($ZEN_6$).

The satellite $S_{16}$ identifies preferred subroutes from the subroutes ending at satellites in the zones $ZEN_2$ and $ZEN_3$ to all of the satellites in the next zone $ZEN_4$ along the routing line toward the destination zone. Subroutes that terminate in the zone $ZEN_1$ (the zone along the routing line in the opposite direction from the destination ground station) are not considered.

The process continues in this fashion from zone to zone along the routing line toward the destination node, in this case the satellite $S_{163}$ in the zone $ZEN_6$. In each step, the initial satellite node ($S_{16}$) calculates subroutes from one zone to the next in the direction of the destination zone, while eliminating from consideration any subroute that terminates in the one zone. The route creation circuitry in the initial satellite thereby assembles from the various preferred subroutes it identifies during the route creation process at least one preferred route to the destination ground station, and then uses one or more of the preferred routes to transmit the data packets to the destination ground station. As noted, when the destination ground station receives the complete data transmission, it returns a confirmation message to the originating ground station via a satellite-to-satellite route created in accordance with any of the methods described herein. Accordingly, in this limited zone/matrix method, the matrix of satellites that has to be considered in each step is limited to the satellites in three zones at a time, rather than all of the satellites in all of the zones as in the full zone/matrix system, thus substantially reducing the time required to calculate one or more preferred routes to the destination ground station.

3. Dynamic-Hold Zone/Matrix System

This method of route creation is used in conjunction with the full/zone matrix system or the limited/zone matrix system described above. In those systems an initial satellite node receives from an originating ground station data transmission packets with address information used by the initial node to create one or more routes to a destination ground station. The initial satellite node holds the data packets until the routes are assembled, which should be a very short time using the methods descried herein. The initial satellite ($S_{16}$ in the present example) then transmits the data packets to a first satellite in each route. When that satellite receives the data successfully, it sends an acknowledgement signal to the transmitting satellite. This data transmission and return acknowledgement continues from satellite to satellite in the route until the last satellite in the route acknowledges receipt of the data transmission.

However, a salient feature of certain aspects of the present Invention is its reliance on probabilities to create long distance routes by using satellites that are not controlled as to their location or orientation once they are airborne. This permits large constellations of satellite linking nodes to be deployed at a very low cost. Because of that paradigm, there may be occasions when the nature of the system makes it difficult for one satellite node to establish communication with another. By the nature of the system, this should be temporary, since another node will likely become available in a short time. The matrix systems described above can readily account for such occurrences.

As noted, each time a satellite sends a data packet to the next node in the system, it listens for an acknowledgement signal. The satellite may attempt several transmissions while holding the data packet, but if after a predetermined number of tries there is still no acknowledgment, the satellite in the route holding the data packet(s) will simply calculate a new route to the destination by one of the full zone/matrix method or the limited zone/matrix method (or another method described herein). This may result in brief delays until the entire data transmission is received by the destination ground station, but it is believed that they will be short enough to be substantially undetectable. When the destination ground station receives the complete data transmission, it returns a confirmation message to the originating ground station via a satellite-to-satellite route created in accordance with any of the methods described herein. Although this will alert the sender that delivery of his or her message might have been held at some point in its transmission to the intended destination, it is also anticipated that most users will tolerate longer transmission times in exchange for having access to email and other forms of communication theretofore unavailable in undeveloped areas.

4. Variable Zone/Matrix System

In another embodiment the zones are drawn by the Initial satellite node after it receives the data transmission packets containing the destination address information. In this variation on the various zone/matrix systems described above, the route creation modules of all of the satellites include software that sets the boundaries of the zones to be used to implement the particular route creation system to be used to transmit the data to the destination ground station. This route creation method can take into account factors such as the number of satellites in a potential zone and the distances between satellites in adjacent zones to maximize the probability of creating a successful route. In one preferred implementation of this method each satellite that receives the data transmission draws its own zone boundaries for the remainder of the route to the destination ground station.

An initial satellite can "draw" zones in any appropriate shapes or sizes. For example, the first zone could be a circle of 2000 miles in diameter centered on an initial satellite, and each succeeding zone could be a similar circle that overlaps by about 500 miles with the first circle (along a line connecting their centers), and so forth to a destination satellite. The circles (or other shapes) are drawn so that the area of the overlap is sufficient to provide a certain number of satellites in the overlapping region. The route creation module is programmed to calculate according to a predetermined probability that a given number of satellites (or a given range of numbers) will enable a successful beam match to be made from at least one satellite in a particular zone to at least one satellite in an overlapping region of that zone and an adjacent zone. In other words, the initial satellite will consider the number of satellites in overlapping regions along the routing line and provide zones with overlapping regions having areas that take into account the number of satellites in each region. The zones can be different sizes depending on the number of satellites in the overlapping regions at the particular time the route is being created.

The initial satellite will give the zones unique identifiers and the matrixes used to effect the creation of a route to the destination satellite will be assembled as discussed above in either of the zone/matrix methods already described. In a variation, the zone boundaries can be changed during the route creation process if the distribution of the satellites between the initial satellite and the destination satellite changes. In addition, a particular step in the chosen route creation process may result in drawing a new routing line that deviates from the originally drawn routing line.

C. Zone/Direction System for Creating Radio Routes with Satellite-to-Satellite Links FIG. 8 will be used to illustrate this zone method of data transmission, which also uses a satellite Infrastructure in which all of the satellites store orbital Information that defines the orbit of every other satellite. With this Information a satellite will know the exact direction in which to transmit radio signals; that is, its data movement module 48 will chose the antenna module or modules from which to transmit the data toward another satellite. As indicated above, this method will be described in connection with the transmission of data from Uyo, Nigeria, to Leyte in the Philippines some 8000 miles away.

As before, it is assumed that the satellite $S_{16}$ is the initial routing node that has received a data transmission from the Uyo ground station for transmission to the satellite $S_{163}$ nearest to the ground station at Leyte. In this route creation method, the initial satellite node $S_{16}$ determines if there are any satellites in the next adjacent zone toward the destination ground station, which in the present example is the zone $ZEN_2$. The satellite $S_{16}$ then sends the data transmission to the satellites $S_{67}$, $S_{17}$, $S_{63}$, and $S_{25}$ using the appropriate antenna feed (see FIG. 6). The satellites that successfully receive the data return an acknowledgement signal to the satellite $S_{16}$. Each satellite in the zone $ZEN_2$ that received the data transmission then sends it to the satellites in the next zone $ZEN_3$, and waits for an acknowledgement signal. The process repeats itself until the data is received by one or more satellites in the zone $ZEN_5$ adjacent to the zone $ZEN_6$ where the destination satellite $S_{163}$ is located. The satellites in the zone $ZEN_5$ that have received the data transmission direct it toward the satellite $S_{163}$, and as before, wait for a return acknowledgement that it was successfully received.

This method of route creation is less calculation-intensive than the matrix methods described in the previous section, but in practice might be less reliable in terms of minimizing any delays in completing data transmissions to their ultimate destination satellites. For example, any one of the satellites in the route may have to send a data transmission multiple times before receiving an acknowledgement from another satellite. As noted above, a certain amount of delay might be an acceptable consequence of having access to electronic communications with far distant geographic locations theretofore unavailable to users in less developed parts of the world. However, it diminishes the utility of the system if messages are delayed too long, or if they do not get through at all in too many Instances.

There are a number of strategies that can be employed to minimize the likelihood that those issues will arise. One way would be for each satellite in the route that has a data transmission on board to attempt sending it to nearby satellites in other zones if it has not received an acknowledgment signal from any satellites to which it initially directed the data. For example, if the satellite $S_{25}$ has not received an acknowledgement signal from any of the satellites in the zone $ZEN_3$ within a predetermined time, it will attempt to send it to the satellite $S_{52}$ in the zone $ZES_3$.

In a variation of this zone/direction system, the zones are drawn by the initial satellite node after it receives the data transmission packets containing the destination address information in the fashion described above in connection with the variable zone/matrix system. That is, the route creation modules of all of the satellites set the boundaries of the zones to be used to implement the particular route creation system to be used to transmit the data to the destination ground station. Likewise, the satellite computers will take into account factors such as the number of satellites in a potential zone and the distances between satellites in adjacent zones to maximize the probability of creating a successful route. In one preferred implementation of this method each satellite that receives the data transmission draws its own zone boundaries for the remainder of the route to the destination ground station.

D. Vector/Direction System for Creating Radio Routes with Satellite-to-Satellite Links In this embodiment each satellite knows its own latitudinal/longitudinal location, but it does not know the orbital parameters of the other satellites. Accordingly, in the example used above, the satellite $S_{16}$ does not know the location of any other satellites in the constellation, but it knows the direction toward which the data transmission it received from the Uyo ground station. As already noted, probabilities suggest that in a 200-satellite constellation at least 40 satellites will be in line of sight with a given satellite at all times. By the same token, given the random nature of the satellites' distribution within the constellation, some of those will be between the present location of the satellite $S_{16}$ and the data transmission's ultimate destination.

Thus, the satellite can use the appropriate antennas or antenna feeds (see FIG. 6) to flood a predetermined expanse of the region in space area between itself and the destination ground station with transmissions of the data, including the location of its destination ground station. As an example, the satellite would calculate the direction (in three dimensions) toward the Leyte ground station and flood a region spanning 60° in a plane parallel to the earth's surface (the x-y plane) and 30° in an up-down direction normal to the earth's surface (the z-axis). The latter region, in the z-direction, will account for variations in satellite altitude, which may have occurred due to orbital decay. If the satellites were distributed as shown in FIG. 8, one or both of the satellites $S_{63}$ and $S_{25}$ might receive the data transmission and return an acknowledgement signal. If the satellite $S_{25}$ received the data, it would in turn flood a like region, whereby the satellites $S_7$, $S_{52}$, and $S_{47}$ might receive the transmission. This step-by-step transmission occurs until the data is received by one or more satellites within line-of-sight of the Leyte ground station, to which the satellite downloads the data transmission. As is the case in all of the data transmission methods described herein, the destination ground station returns a confirmation message to the originating ground station via a satellite-to-satellite route when the destination ground station receives the complete data transmission.

IV. OTHER MODIFICATIONS AND VARIATIONS

This section discusses modifications, variations, and additions to the systems described above that can enhance the reliability and increase the speed of data transmissions between ground stations as well as add utility to the systems in other ways.

A. Rotating Satellites

As already discussed, designing a satellite-based radio mesh system in accordance with the above description involves myriad trade-offs among a wide variety of parameters. Two particular parameters that work at cross purposes, and thus require judicious selection, are the beam widths of radio signals transmitted by the antennas and the power (gain) of the antennas. On the one hand, greater beam width will Increase the probability that a beam match can be created, but a greater beam width reduces the gain of the antenna. Conversely, a narrower beam will increase antenna gain, but reduce the probability of creating a beam match between nodes. This trade-off is particularly significant in the satellite nodes because the satellite antenna configuration has to take into consideration constraints on the weight and size of the satellites, which limits the number of antennas the satellite can carry, and on the electrical power available from onboard batteries. It is also desirable to increase the number of possible beam matches between nodes because some radio beams may be weakened by grazing the earth's surface, which can partially block the signal before it reaches a receiving node.

Achieving the proper trade-off between beam width and antenna gain is important to the efficient functioning of a random-orbit satellite system. Such a system relies on the statistical probability that routes can be created using randomly orbiting satellites to create and select routes. Typically, the satellites' antennas point out into space—towards each other and the earth—to enable the establishment of links between nodes. A fundamental property of the system is its dependence on routing signals and data transmissions of sufficient strength reaching other nodes (ground stations and satellites). The system relies on having enough satellites in orbit and making the proper design trade-offs, including beam width vs. gain, to enhance the probability that a suitable route can be created between two ground stations via one or more satellites. However, there may be system installations in which better data transmission could be achieved by a multiple satellite route if the probability of creating high quality links between satellites is increased.

The present embodiment utilizes satellites that rotate about an axis, which, as explained herein, increases the likelihood that a route with high quality links and subroutes can be created using multiple satellites. As explained below, employing rotating satellites enables beam width to be reduced, with a corresponding increase in gain.

An exemplary satellite configuration uses 25 antennas covering about 60% of the surface of a spherical satellite. Thus, a rough estimate of the probability of a radio beam transmitted by such a satellite being received by another like satellite would be about 36% (0.6×0.6). It will be appreciated by those skilled in the art that this is only an estimate, since the radio beams will have side lobes that will increase the probability that a link will be created to a certain extent. If the diameter of the satellite is doubled, the diameter d of a parabolic dish antenna can also be doubled. By the equation $\alpha=(k\times\gamma)/d$, the half power beam width (HPBW) will be halved. While the area of the beam will be only ¼ as large, the antenna gain will be increased by a factor of four, or about 6 dB. On the other hand, the probability of a beam match between satellites is reduced to about 2% (36%×(¼)²).

In the present embodiment the establishment of radio links by beam matching between satellites is enhanced by using satellites that are deployed into orbit deliberately spinning about a rotational axis. In one implementation, the satellites themselves have the same components as the satellite depicted in FIGS. 2 and 3 and described in the text above associated with them.

The angular velocity of the satellites will be relatively high. For purposes of illustrating the operation of a typical system using rotating satellites, it will be assumed that the satellites are deployed with an angular velocity $\omega=2\pi$ rad/sec (60 rpm). Those skilled in the art will understand that this example is not meant to be limiting and that it is within the scope of this disclosure to employ any angular velocity effective to establish radio routes and transmit data as described and claimed herein. The orientation of the axis of rotation will not be controlled, but principles of physics dictate that each satellite will assume an axis of rotation through its center of mass and the axis of rotation will precess around the angular velocity $\omega$. However, the orientation of the axis of rotation at any given time does not affect the creation of radio links, as will be apparent from the discussion that follows.

Rotating satellites increase the probability of a transmitted radio beam being received by another satellite because the satellite antennas "sweep" an area as the satellite rotates. This can be understood by considering the satellite $S_\omega$ shown in FIG. 10A, which is schematic cross-section through the satellite "equator," corresponding to the equator 16 of the satellite 10 in FIG. 2. In this example, the satellite $S_\omega$ comprises five antennas $12_1$, $12_2$, $12_3$, $12_4$, and $12_5$, each having an HPBW of 35°, arranged equally around its equator 16 and rotating about the z-axis at an angular velocity $\omega$. A location RL remote from the satellite and lying in the plane of the equator will "see" five antennas as the satellite rotates through one complete revolution. It will be understood that this number will be different for locations not in the equatorial plane, but the principle still holds. It will also be appreciated that the number may Increase or decrease because of precession about the rotational axis, but most locations remote from the satellite (including ground stations) will still see plural antennas as the satellite rotates. Thus, a second satellite with its equatorial plane in the equatorial plane of the first satellite $S_\omega$, the probability of being able to create a radio link with a 6 dB gain Increase over the tumbling satellite example above is about 10% (5 antennas×2% for each antenna). The probability of creating a beam match with a ground station antenna is likewise increased.

It will be understood that this is a highly idealized representation, which ignores factors such as precession of the satellites around their axes of rotation, but it nevertheless illustrates the concept that rotating satellites present an increased probability for the creation of beam matches between two satellites. Nevertheless, considering the large number of randomly orbiting satellites available for route creation, the increased probability of beam matches using rotating satellites will in many, if not most, cases be sufficient to enable assembly of a radio route with higher quality links between two ground stations via multiple satellites. While this will have special applicability in reaching ground stations separated by large distances, it also can increase the reliability of radio routes between ground stations in other settings.

1. Counter-Rotating Satellites

Figure 10A:
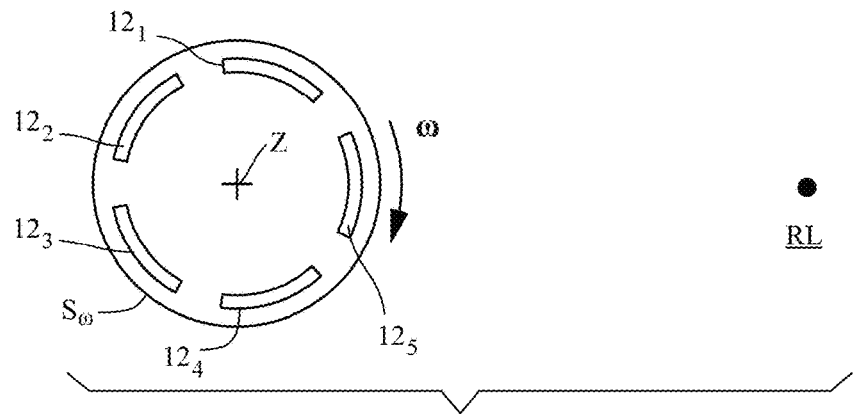
FIG. 10, comprising FIGS. 10A, 10B, and 10C, schematically depicts rotating satellites in accordance with an alternate embodiment of a space-based communication system employing satellite-to-satellite radio links.
Figure 10B:
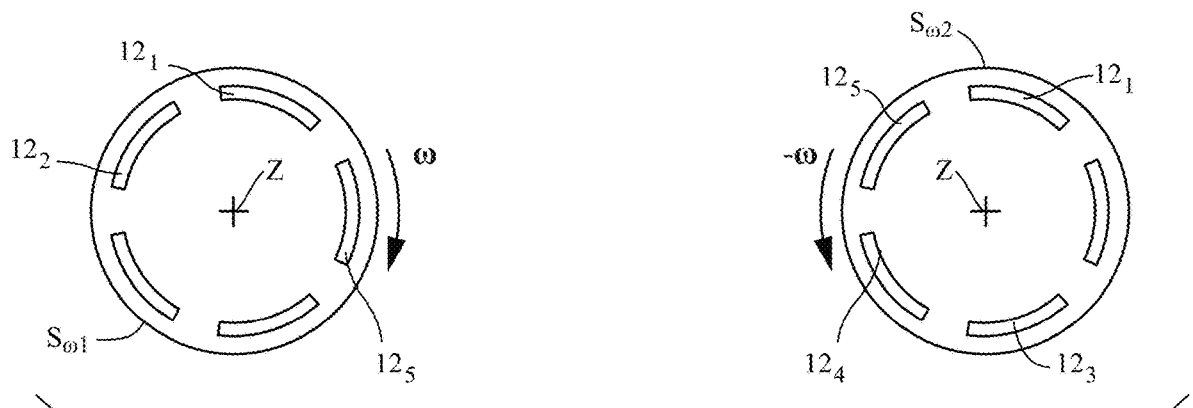

The satellites are preferably deployed with about half of them rotating in a first direction about their rotational axis and the other half rotating in the opposite direction. FIG. 10B, which uses like numerals for like parts in FIG. 10A, illustrates this principle by showing the satellite $S_{\omega 1}$ rotating at an angular velocity $\omega$ in a first direction and a second satellite $S_{\omega 2}$ rotating at the same angular velocity $-\omega$ (in the opposite rotational direction). This illustrates how a beam match between antenna $12_5$ in satellite $S_{\omega 1}$ and antenna $12_4$ in satellite $S_{\omega 2}$ will be sustained longer than if the two satellites were rotating in the same direction. That is, if the satellites are rotating in opposite directions, facing antennas on the satellites are traveling at essentially the same linear velocity relative to each other. On the other hand, if the satellites are rotating in the same direction, their relative linear velocity is twice the linear velocity of each. With a sufficient number of satellites in orbit (200 in the previous embodiment), it is believed that there is a significant probability of having a plurality of counter-rotating satellites over any given geographic area for which a radio route is being established. Thus, the likelihood of quickly establishing a relatively long-lasting satellite-to-satellite link is increased by deploying at least some, and preferably about one-half, of the satellites rotating in the opposite direction from the others. In addition, not only are two antennas on respective satellites in alignment longer, but as soon as they rotate out of view of each other, two other antennas of the satellites may align, thus enabling rapid refreshing of the radio link between the satellites. In the example illustrated in FIG. 103, antenna $12_1$ in satellite $S_{\omega 1}$ and antenna $12_5$ in satellite $S_{\omega 2}$ will align next.

Like the example used to illustrate the increased efficacy of using rotating satellites discussed just above, this is also an idealized description of how counter-rotating satellites can create longer lasting radio links between them. In addition, to the assumptions underlying the above description, there may not be at any given time two counter-rotating satellites over an area where a radio route is desired between two ground stations. Nevertheless, taken together, these examples illustrate the point that rotating satellites, and particularly counter-rotating satellites, will provide a sufficient probability of establishing a relatively high gain radio link between the random orbit satellites to enable reliable data communications between two satellites. And because the antennas point in a plurality of directions (preferably over the entire spherical space surrounding the satellite), the opportunity for establishing a radio link between satellites will in most instances be enhanced by using rotating satellites.

2. Satellites Rotating at Different Angular Velocities

Figure 10C:
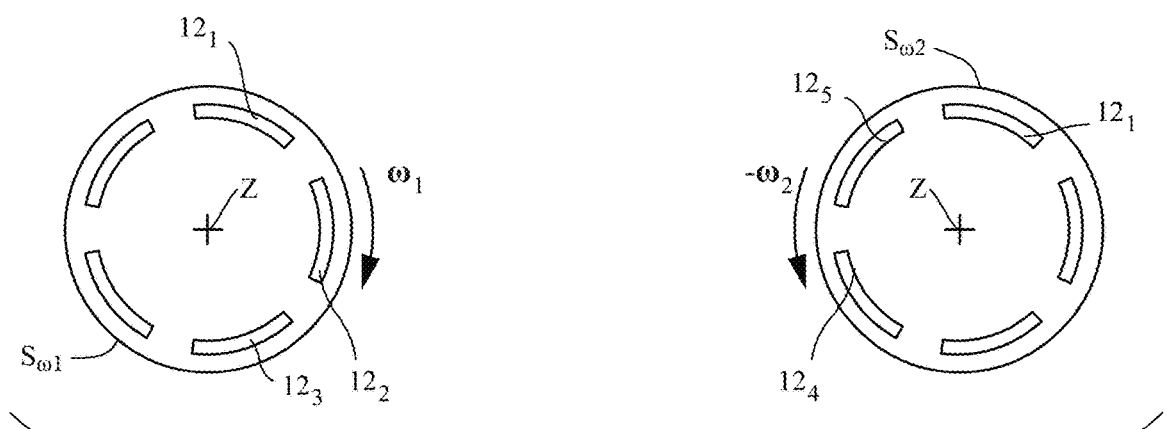

A variation of the embodiment described just above employs satellites that rotate at different angular velocities. This variation is depicted schematically in FIG. 10C, in which the satellite $S_{\omega 1}$ rotates at an angular velocity $\omega_1$ and $S_{\omega 2}$ rotates at a different angular velocity $\omega_2$. The advantage of this system is that the antennas on the counter-rotating satellites may be out of phase in the sense that antenna on one satellite may be pointing directly to a space between antennas on a second satellite, as depicted in FIG. 10C. If the satellites are rotating at the same angular velocity, this situation can persist for an extended period of time, thus weakening a radio link between the satellites, or perhaps preventing the establishment of a link altogether. Rotating the satellites at different angular velocities will increase the likelihood that at some angular position antennas on both satellites will face each other (be in phase), thus enabling the establishment of a useful radio link between them. For example, in the case illustrated in FIG. 10C, the antennas on the satellites are exactly 180° out of phase, in that the antenna $12_2$ on satellite $S_{\omega 1}$ is pointing directly at the space between the antennas $12_4$ and $12_5$ on satellite $S_{\omega 2}$. If w=1.33×$\omega_2$, the antenna $12_5$ on satellite $S_{\omega 1}$ and the antenna $12_5$ on satellite $S_{\omega 2}$ will line up as the satellites rotate.

It is believed that the use of satellites rotating at different angular velocities will reduce even further any possible delays in establishing radio links between satellites and between satellites. In an exemplary approach, the cohort of satellites could be divided into five groups with different angular velocities in accordance with the following table.

TABLE 1

| | |
|---|---|
| Very slow spinner: | 0.68 revolutions per second |
| Slow spinner: | 0.84 revolutions per second |
| Average spinner: | 1.0 revolution per second |
| Fast spinner: | 1.16 revolutions per second |
| Very fast spinner: | 1.32 revolutions per second |

The discussion immediately above explains how this can tend to increase the probability of establishing beam matches between the antennas on respective satellites. That is, the above discussion demonstrated one instance of how a satellite rotating at an angular velocity 1.33 times the angular velocity of another can facilitate a beam match. The same principle applies for other multiples of angular velocity.

By the same token, this system implementation will also make more beam matches possible in a given time period because the antennas on one satellite will have more opportunities to line up sufficiently with antennas on another satellite to form beam matches if the satellites are counter-rotating at different angular velocities. There may be no beam matches between two satellites at a given time, or for a certain interval, as they rotate. However, as they continue to rotate at different angular velocities, antennas on the satellites will likely form beam matches because antennas on the respective satellites will be likely to line up at some point. This may take plural revolutions of the satellites, but rotation at different angular velocities greatly increases the probability that many more matches will be created as the satellites continue to rotate. It will thus be appreciated from the complex interrelationship of the antennas on different satellites as the satellites move in their orbits and rotate about their axes that providing plural cohorts of satellites rotating at respective different angular velocities will increase the probably of creating more beam matches between pairs of the satellites during any given time interval.

3. Other Considerations

It is known that the angular velocity of a body rotating in earth orbit, especially at lower altitudes, is subject to decay from a number of factors. For example, even though the earth's atmosphere is extremely thin at low-earth orbital altitudes, the region in which satellites used in the present system will preferably occupy, orbiting objects nevertheless still experience aerodynamic drag. Forces generated by the passage through the earth's magnetic field of ferromagnetic materials in the object can also affect the angular velocity of a rotating body such as a satellite. The tendency of the rotating satellites to undergo a reduction in angular velocity over time can be compensated for in a variety of ways. One is to use retro rockets or active mechanical devices known in the prior art. However, since one of the objects of the invention is to minimize the cost of building, deploying, and maintaining the satellites used in the systems described herein, it is preferred to use passive means for compensating for external forces on the satellites or for creating forces to control satellite movements.

One such means uses solar panels with solar cells only on one side to utilize the momentum of photons striking the panels to create a torque about the rotational axis of the satellite. For example, referring to FIGS. 2 and 3, for a satellite that is deployed to rotate counterclockwise about the z-axis (as viewed in the negative-z direction), each solar panel 14a would have solar cells only on one side, namely the side facing the viewer for the solar panel 14a to the right in FIG. 3 and the side facing away from the viewer for the other solar panel 14a to the left in FIG. 3. The remaining solar panels would still have solar cells on both sides. Although larger solar panels will increase aerodynamic drag on the satellite, it is believed that it will be possible through judicious design to provide solar panels of a size, configuration, and orientation that will generate a net torque on the satellite that overcomes the tendency of the angular velocity to decay.

It is likewise believed possible to selectively distribute the mass of the satellite components to cause it to rotate about a particular axis. Since it is anticipated that the battery will form a large proportion of the satellite mass, it will preferably be located at the center of mass of the satellite and have a mass distribution that is symmetric about the axis of rotation. In addition, the effects of the earth's magnetic field on the satellites can be minimized by using non-ferromagnetic materials such as aluminum wherever possible. These features, in addition to the use of the solar panels to provide a moment about the rotational axis, will suffice to at least reduce the rate of decay of the satellites' angular velocity.

As mentioned above, some or all of the above passive means for controlling satellite attitude can be employed. That is, in one variation one or more solar panels can have solar cells on only one side to impart an unbalanced moment on the satellite to cause it to continue to tumble. Another variation could locate ferromagnetic materials in selected locations on the satellite that will produce forces that vary in magnitude and direction as the satellite traverses the earth's magnetic field.

Since satellites originally deployed to rotate will likely remain in orbit even if their Initial angular velocity decays over time, they will still be available as nodes in a radio route between ground stations. Since satellites in accordance with the present system are inexpensive to construct, launch, and deploy, additional rotating satellites can be launched to replace any whose angular velocity has decayed. This will not only increase the number of satellites available for route creation, but to the extent that any of the older satellites remain spinning, the effect will be to automatically take advantage of the improved performance made capable by using satellites rotating at different angular velocities.

B. Drone-Mounted Ground Stations

In another variation of the systems described above, the ground stations can be mounted on low-flying drones ("unmanned vehicle"). This will increase the terrestrial area served by a particular ground station depending on the altitude of the drone. By the equation $GR=1.22 \times h^{1/2}$, where h is the drone altitude in feet and GR is the distance to the horizon from the drone in miles, a drone at an altitude of 500 ft will theoretically be visible to a user on the ground from a distance of about 25 mi. If the drone altitude is 200 ft., the comparable distance is 15 mi. The actual distances can be less depending on topological features such as hills or buildings between the user and the drone, or somewhat more if the user is in an elevated location. It is believed that the maximum desirable altitude will be in the neighborhood of 500 ft. to avoid any possible interference with low-flying aircraft that might be in the region. However, in very remote areas, the altitude could be as much as 1000 ft. (GR=35 mi.) or more.

The drones will include GNSS module similar to the one in the satellites that determine the drone's longitude and latitude and a servo system to maintain the drone in a substantially fixed position by controlling the standard guidance mechanism in known drone constructions. That is, the drone will include a computer programmed with software or firmware that includes the desired location in longitude and latitude at which the drone is to be deployed. The computer will generate an error signal if the drone strays from the desired location and the servo system will adjust the drone's flight controls to maneuver it back to the desired location. Thus, a drone-mounted ground station will be the exact equivalent of a terrestrial ground station.

This arrangement would have particular utility in rural areas where user density is low and a single drone-mounted ground station could serve as many users as multiple terrestrial ground stations. In addition, the ground stations could be flown to a centrally located maintenance facility for repairs or upgrades, and replaced with new ground stations without service interruptions. In that way maintenance crews would not have to be dispatched to remotely located and difficult to access ground stations. This is especially advantageous in the case of providing access to users in sparsely populated, undeveloped areas such as heavily forested regions like African or South American jungles, or remote islands in the East Indies.

C. Blockchain Principles Applied to Radio Routes with Satellite-to-Satellite Links The satellite communications systems described herein are especially adapted for the application of principles underlying distributed ledger technology. A blockchain Is a distributed ledger verified and copied across multiple computers, typically numbering in the hundreds or thousands. As applied to the systems and methods described herein, each of the satellites and ground stations can be considered a node in a blockchain used to record and distribute information concerning the various aspects of the routing and data transmissions executed as part of the routing message and/or data transmissions among and between ground stations, each of which can be considered a node in the blockchain.

Blockchain principles can be applied to the present system in various ways. For example, each time a data transmission is uploaded to an initial satellite node, it can be recorded as a transaction that is distributed to all of the nodes in the system. Other transactions, such as the confirmation signal returned to a destination ground node after completion of a data transaction, which is a feature of all of the embodiments described above, can also be recorded at each node.

These recorded transactions can be used for various purposes. For example, the number of times a particular user accesses the system and the number of completed data transmissions can be used by the system owner for billing purposes or to compile statistics on usage or successful transmissions.

V. SUMMARY AND CONCLUSION

A basic paradigm underlying many of the novel radio communications systems described herein is that they comprise multiple satellites that orbit the earth in orbital planes extending over a predetermined range of latitudes north and south of the equator. Components of the satellites enable them to facilitate the creation of multiple radio links between three or more satellites by using a large constellation of satellites-typically between 100 and 200, depending on the area of the earth to be served by the system. Components in the satellites themselves, as opposed to any central command computer, create the satellite-to-satellite links. Each satellite in the system includes GNSS circuitry for determining the location of the satellite relative to the earth's surface and route creation circuitry for calculating, virtually in real time, the direction from the satellite's location at a particular instant to the location of a destination ground station. Antenna pairing circuitry transmits a radio signal from a plurality of directional satellite antennas in the general direction of the destination ground station. Because of the large number of satellites in the constellation, it is likely that at least one other satellite will receive the radio signal and return a confirmation signal. The other satellite, knowing its own location, transmits a radio signal in the general direction of the destination ground station. This continues until the signal is received by the ground station.

In an embodiment designed to increase the likelihood of successfully creating a radio route to the destination ground station, each satellite has a unique identifier associated with it and stores orbital information defining the locations of all of the orbiting satellites in the system at any particular time. Each satellite also includes route creation circuitry for calculating the locations of a plurality of other satellites in the system at a particular time based on the stored orbital information. The antenna pairing circuitry transmits a radio signal, which includes the unique identifier associated with the transmitting satellite, from at least one of a plurality of directional satellite antennas toward at least one other satellite whose location was calculated by the route creation circuitry.

The preceding description outlines a large number of ways the different embodiments can be adapted for multi-satellite route creation between far distant locations on the ground. For one thing, they are particularly adapted to systems in which the satellites are distributed in random orbits (as defined above), one key being the presence in each satellite of virtually real-time information on its location. In various "zone/matrix" embodiments discussed above, every satellite knows the location of every other satellite in the system at any particular instant. These systems are particularly proficient in enabling satellites to successfully transmit and receive radio signals even though they move in and out of range of each other and relative to originating and destination ground stations. Different strategies for creating routes in the various zone/matrix systems include using route creation circuitry in the satellites that can divide the earth into zones and create routes from an initial satellite on a zone-by-zone basis.

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A radio communications system comprising a constellation of orbiting satellites disposed in uncontrolled orbits for communicating data addressed to a destination ground station via a radio route including at least one radio link between two of the satellites, wherein each satellite in the constellation includes:

circuitry for determining the location of the satellite relative to the earth's surface;

a plurality of directional satellite antennas for receiving radio signals from a plurality of other satellites and for transmitting radio signals to a plurality of other satellites;

route creation circuitry for storing orbital information defining the locations at any particular time of a plurality of the other satellites in the constellation, wherein the route creation circuitry determines from the stored orbital information the location of least one other satellite in the direction of the destination ground station; and antenna pairing circuitry for creating a radio link with at least one other satellite by transmitting a routing radio signal from at least one of the plurality of the directional satellite antennas in the direction of the at least one other satellite whose location was determined by the route creation circuitry.

2. A system as in claim 1, wherein the satellites in the constellation comprise a blockchain in which each satellite stores the orbital information of substantially all of the other satellites in the constellation and the orbital information stored in each satellite is updated periodically with the orbital information stored in the other satellites.

3. A system as in claim 2, wherein the additional satellite added to the constellation receives the orbital information of the other satellites from at least one other satellite and the orbital information of the additional satellite is transmitted to the other satellites.

4. A system as in claim 1, wherein each satellite transmits its orbital information to one or more ground stations for transmission thereof to other satellites.

5. A system as in claim 1, wherein the area covered by the satellite constellation is divided into a plurality of zones, the data is uploaded from an originating ground station to an initial routing satellite, and the route creation circuitry in the initial routing satellite determines the boundaries of the zones in the direction of the destination ground station.

6. A system as in claim 1, wherein each satellite has an orientation determined without active attitude control.

7. A system as in claim 1, wherein each satellite includes passive attitude control means for controlling its orientation.

8. A system as in claim 1, wherein the data comprises packets of digital data for transmission from an originating ground station to the destination ground station, each data transmission packet including a header including the address information of the destination ground station and a payload including a data stream representing the content of the transmission.

9. A system as in claim 1, wherein the data is transmitted from an originating ground station to the destination ground station, at least one of the originating ground station and destination ground station comprising a transceiver mounted on an unmanned vehicle above the surface of the earth for transmitting/receiving the data.

10. A system as in claim 1, wherein the satellites have a rotational velocity about an axis of rotation.

11. A system as in claim 1, wherein each of multiple antennas of the plurality of directional satellite antennas comprises a reflector with a plurality of feeds for transmitting radio signals in a corresponding plurality of directions different from each other and for receiving radio signals in different directions.

12. A system as in claim 1, wherein substantially all of the satellites in the constellation have orientations determined without attitude control and the directional satellite antennas on substantially all of the satellites in the constellation are arranged to transmit and receive radio signals in multiple directions around substantially the entire spherical space surrounding each satellite.

13. A system as in claim 1, wherein each of a plurality of the satellites includes passive attitude control means for controlling its orientation and the directional satellite antennas on each of the satellites with passive attitude control means are arranged to transmit and receive radio signals in multiple directions around less than the entire spherical space surrounding each of the satellites.

14. A system as in claim 1, wherein a radio route from an initial satellite receiving a data transmission from an originating ground station to a destination ground station identified by address information in the data transmission includes at least one radio link between an initial routing satellite receiving the data transmission from the originating ground station and a second satellite, and a second radio link between the second satellite and a third satellite included in the radio route to the destination ground station.

15. A system as in claim 1, wherein each satellite receiving a routing radio signal transmits a routing confirmation signal from the directional antenna on which it received the routing radio signal, and the satellite receiving the routing confirmation signal transmits the data from the directional antenna on which it received the routing confirmation signal.

16. A radio communications system as in claim 1, wherein:
the constellation comprises at least 100 orbiting satellites covering an area of the earth's surface extending over a predetermined range of latitudes north and south of the equator, the area covered by the satellite constellation being divided into a plurality of zones of at least 1,000,000 square miles each;
each satellite has a unique identifier associated with the satellite;
the route creation circuitry in each satellite determines from the stored orbital information the zone in which the satellite is located and the zone in which at least one other satellite in the direction of the destination ground station is located; and
the routing radio signal includes the unique identifier associated with the satellite transmitting the routing radio signal.

17. A radio communications system as in claim 1, the area covered by the satellite constellation being divided into a plurality of zones, wherein the route creation circuitry in each satellite determines from the stored orbital information the zone in which the satellite is located and the zone in which at least one other satellite in the direction of the destination ground station is located.

18. A system as in claim 17, wherein the circuitry for determining the location of the satellite relative to the earth's surface communicates with a GNSS system and the zones have boundaries stored in each satellite's route creation circuitry prior to deploying it into orbit.

19. A system as in claim 17, wherein the data is uploaded from an originating ground station to an initial routing satellite and the route creation circuitry in the initial routing satellite determines the boundaries of the zones in the direction of the destination ground station.

20. A system as in claim 17, wherein the initial routing satellite defines at least two zones with an overlapping region.

21. A system as in claim 17, wherein the zones have boundaries defined by their longitudes and latitudes.

22. A system as in claim 17, wherein:
the route creation circuitry in a first satellite receiving a routing radio signal determines a quality of the received routing radio signal indicative of the transmitting satellite's suitability as a node in the radio route and transmits from a plurality of the receiving satellite's directional antennas a further routing radio signal including the quality of the received routing radio signal; and
the antenna pairing circuitry in a second satellite receiving the further routing radio signal selects the first satellite as a radio link with the second satellite based on the quality of the further routing radio signal and the quality of the routing radio signal included therein.

23. A system as in claim 17, wherein the route creation circuitry in a satellite receiving a routing radio signal determines the boundaries of the zones in the direction of the destination ground station.

24. A system as in claim 1, wherein:
the route creation circuitry in a first satellite receiving a routing radio signal determines a quality of the received routing radio signal indicative of the transmitting satellite's suitability as a node in the radio route and transmits from a plurality of the receiving satellite's directional antennas a further routing radio signal including the quality of the received routing radio signal; and
the antenna pairing circuitry in a second satellite receiving the further routing radio signal selects the first satellite as a radio link with the second satellite based on the quality of the further routing radio signal and the quality of the routing radio signal included therein.

25. A system as in claim 24, wherein the quality of the second routing signal is based at least in part on the direction of a relative velocity vector between the first and second satellites.

26. A system as in claim 1, wherein the satellites are disposed in orbits that cover an area of the earth's surface extending over a predetermined range of latitudes north and south of the equator.

27. A system as in claim 26, wherein the orbital information stored by the route creation circuitry of the satellites defines the locations at any particular time of a majority of the other satellites in the constellation.

28. A system as in claim 1, wherein the orbital information stored by the route creation circuitry of a particular satellite defines the locations at any particular time of a majority of the other satellites in the constellation.

* * * * *

UNITED STATES PATENT AND TRADEMARK OFFICE
CERTIFICATE OF CORRECTION

PATENT NO. : 11,206,079 B2  
APPLICATION NO. : 16/997973  
DATED : December 21, 2021  
INVENTOR(S) : Gerald R. Schloemer It is certified that error appears in the above-identified patent and that said Letters Patent is hereby corrected as shown below:

In the Claims

Column 38, Line 56, in Claim 3, should read:  
-- 3. A system as in claim 2, wherein an additional satellite --

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*